US012539040B2

(12) United States Patent
Ralston et al.

(10) Patent No.: US 12,539,040 B2
(45) Date of Patent: Feb. 3, 2026

(54) DEVICE-ASSISTED EYE IMAGING AND/OR MEASUREMENT

(71) Applicant: Tesseract Health, Inc., Guilford, CT (US)

(72) Inventors: Tyler S. Ralston, Clinton, CT (US); Jonathan M. Rothberg, Miami Beach, FL (US); Maurizio Arienzo, New York, NY (US); Paul E. Glenn, Wellesley, MA (US); Mark M. Meyers, Madison, CT (US); Jacob Coumans, Old Lyme, CT (US); Edward A. DeHoog, Long Beach, CA (US); John Glenn, Carlisle, MA (US)

(73) Assignee: Tesseract Health, Inc., Guilford, CT (US)

( * ) Notice: Subject to any disclaimer, the term of this patent is extended or adjusted under 35 U.S.C. 154(b) by 846 days.

(21) Appl. No.: 17/554,172

(22) Filed: Dec. 17, 2021

(65) Prior Publication Data

US 2022/0192490 A1 Jun. 23, 2022

Related U.S. Application Data

(60) Provisional application No. 63/127,962, filed on Dec. 18, 2020.

(51) Int. Cl.
*A61B 3/14* (2006.01)
*A61B 3/00* (2006.01)
*A61B 3/12* (2006.01)

(52) U.S. Cl.
CPC .............. *A61B 3/14* (2013.01); *A61B 3/0008* (2013.01); *A61B 3/12* (2013.01)

(58) Field of Classification Search
CPC ........... A61B 3/14; A61B 3/0008; A61B 3/12; A61B 3/0033; A61B 3/1208
(Continued)

(56) References Cited

U.S. PATENT DOCUMENTS 6,546,198 B2   4/2003   Ohtsuka
10,321,822 B1  6/2019   Lee et al.
(Continued)

OTHER PUBLICATIONS

International Search Report and Written Opinion mailed Mar. 9, 2022 in connection with International Application No. PCT/US2021/063967.
(Continued)

*Primary Examiner* — Balram T Parbadia
*Assistant Examiner* — Alex Park Rickel
(74) *Attorney, Agent, or Firm* — Wolf, Greenfield & Sacks, P.C.

(57) ABSTRACT

Aspects of the present disclosure provide improved techniques to assist imaging and/or measuring a subject's eye that are suitable for use in an imaging and/or measuring apparatus operated by the subject, even in the absence of a clinician or technician, thereby improving access to medical grade imaging and/or measurement. Some aspects relate to techniques for receiving user input and capturing a medical grade image and/or measurement of a subject's eye responsive to receiving the user input. Some aspects relate to techniques for providing visual feedback to a user of an imaging and/or measuring apparatus indicating a location of a subject's eye in a field of view of the imaging and/or measuring apparatus. Some aspects relate to techniques for selectively illuminating a first portion of a subject's eye with illumination light and capturing an image of the first portion of the subject's eye.

20 Claims, 30 Drawing Sheets

(58) Field of Classification Search
USPC .................................. 351/206, 207, 208, 221
See application file for complete search history.

(56) References Cited

U.S. PATENT DOCUMENTS

| | | | |
|---|---|---|---|
| 10,653,311 | B1 | 5/2020 | Pascal et al. |
| 11,435,177 | B2* | 9/2022 | Ralston ................ A61B 3/0008 |
| 11,737,665 | B2* | 8/2023 | Ralston ................ A61B 3/0008 |
| | | | 351/206 |
| 11,986,243 | B2* | 5/2024 | Huang .................... A61B 3/12 |
| 2012/0050672 | A1 | 3/2012 | Aikawa |
| 2014/0146288 | A1 | 5/2014 | Anand et al. |
| 2014/0267668 | A1* | 9/2014 | Ignatovich ............. A61B 3/125 |
| | | | 348/78 |
| 2015/0181101 | A1 | 6/2015 | Ciudad et al. |
| 2015/0335242 | A1* | 11/2015 | Saito ........................ A61B 3/12 |
| | | | 351/246 |
| 2016/0270655 | A1 | 9/2016 | Caraffi et al. |
| 2016/0377391 | A1 | 12/2016 | Rubtsov et al. |
| 2019/0042842 | A1 | 2/2019 | Cavin et al. |
| 2019/0046031 | A1* | 2/2019 | Kramer ................... A61B 3/14 |
| 2020/0191553 | A1 | 6/2020 | Rothberg et al. |
| 2020/0397285 | A1 | 12/2020 | Ralston et al. |
| 2021/0127969 | A1 | 5/2021 | Oggenfuss et al. |

OTHER PUBLICATIONS

DeHoog et al., Optimal parameters for retinal illumination and imaging in fundus cameras. Optical Society of America. Dec. 20, 2008; 47(36): 6769-77.

\* cited by examiner

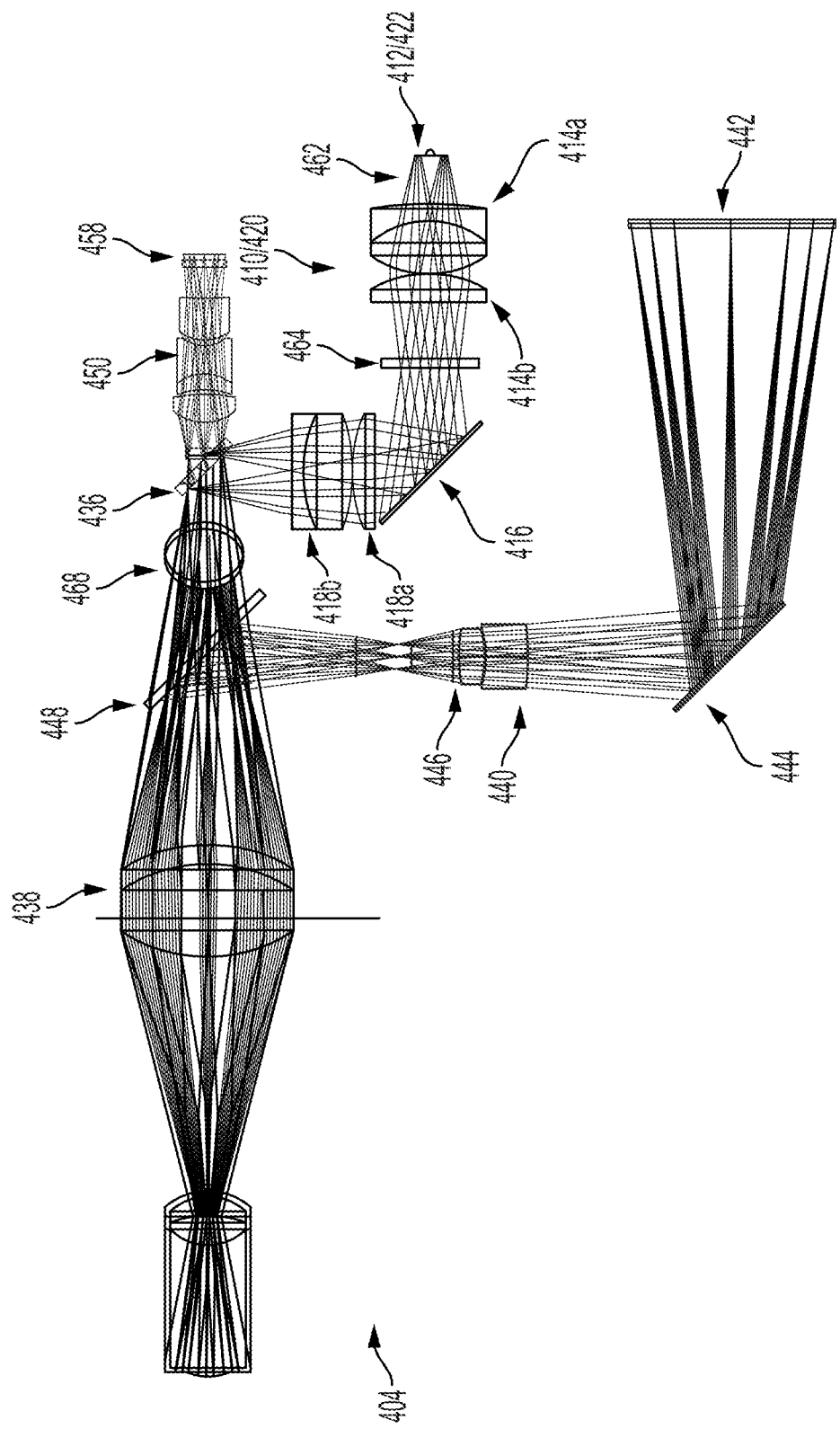

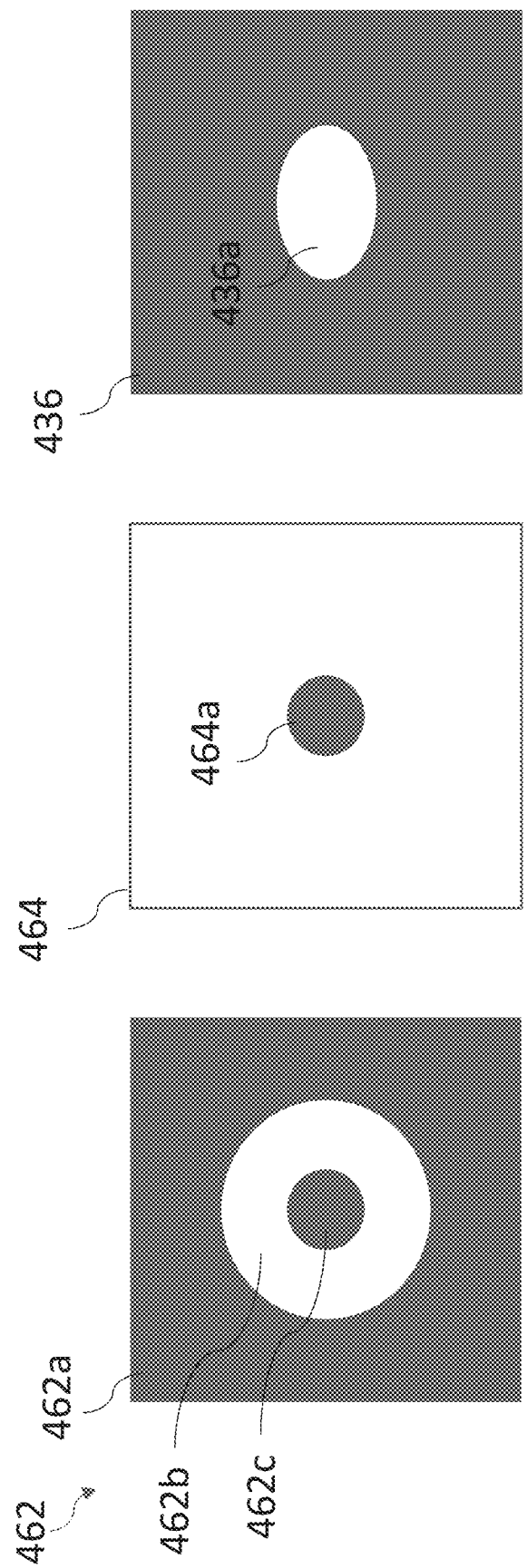

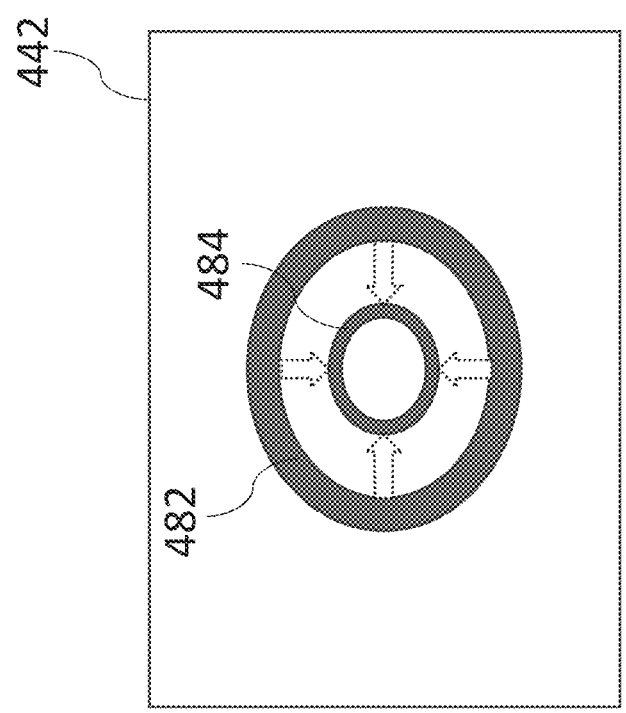

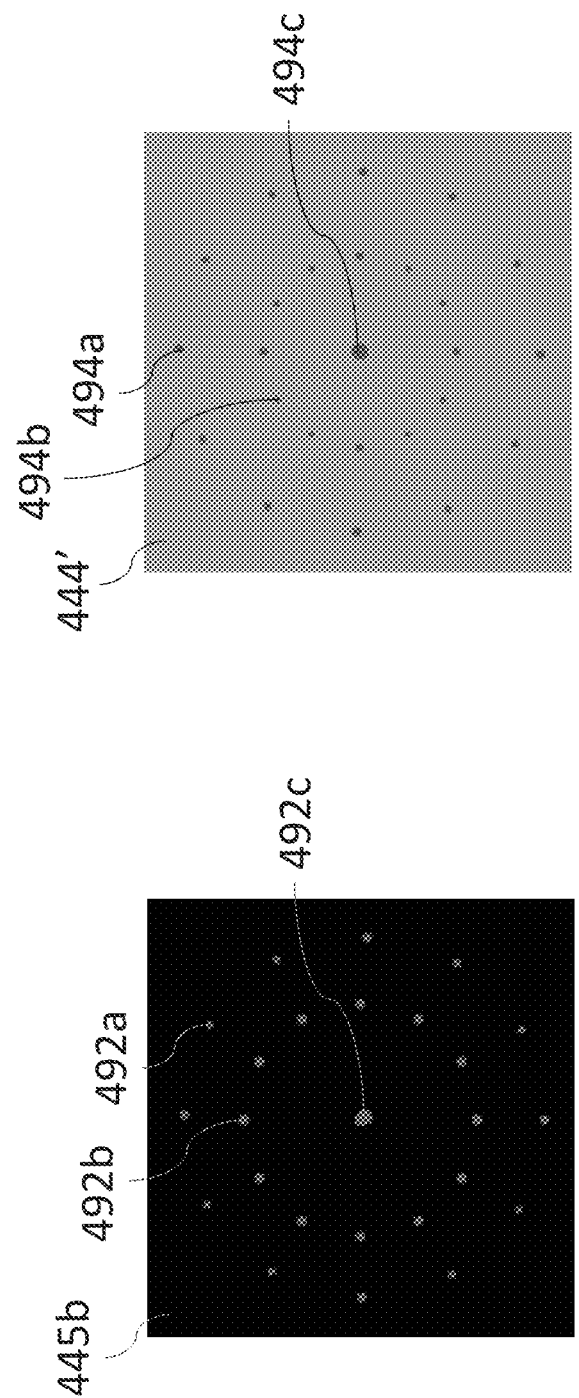

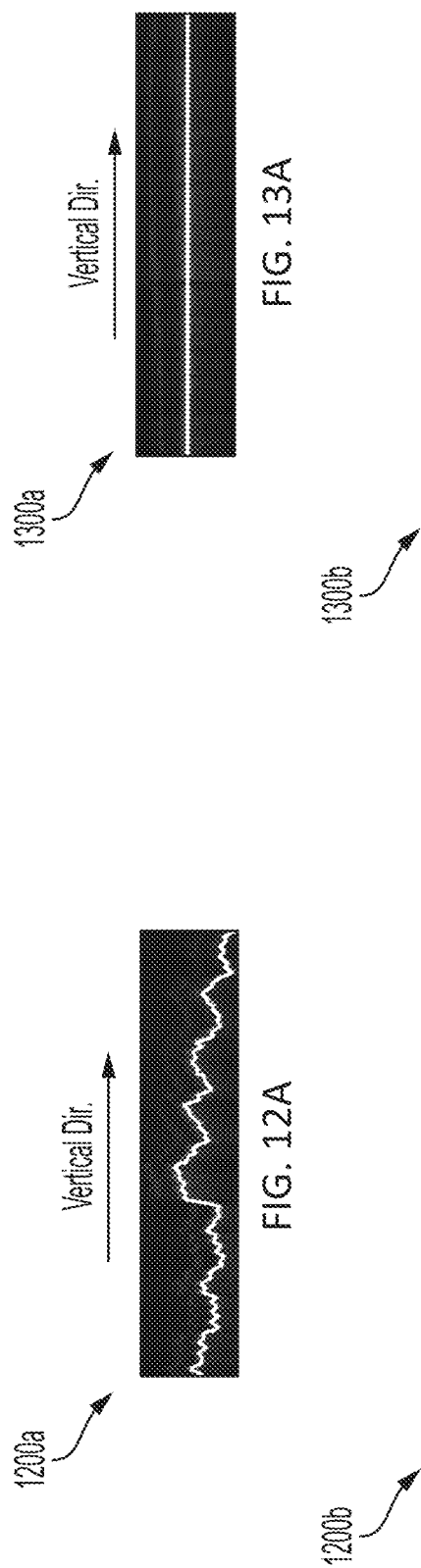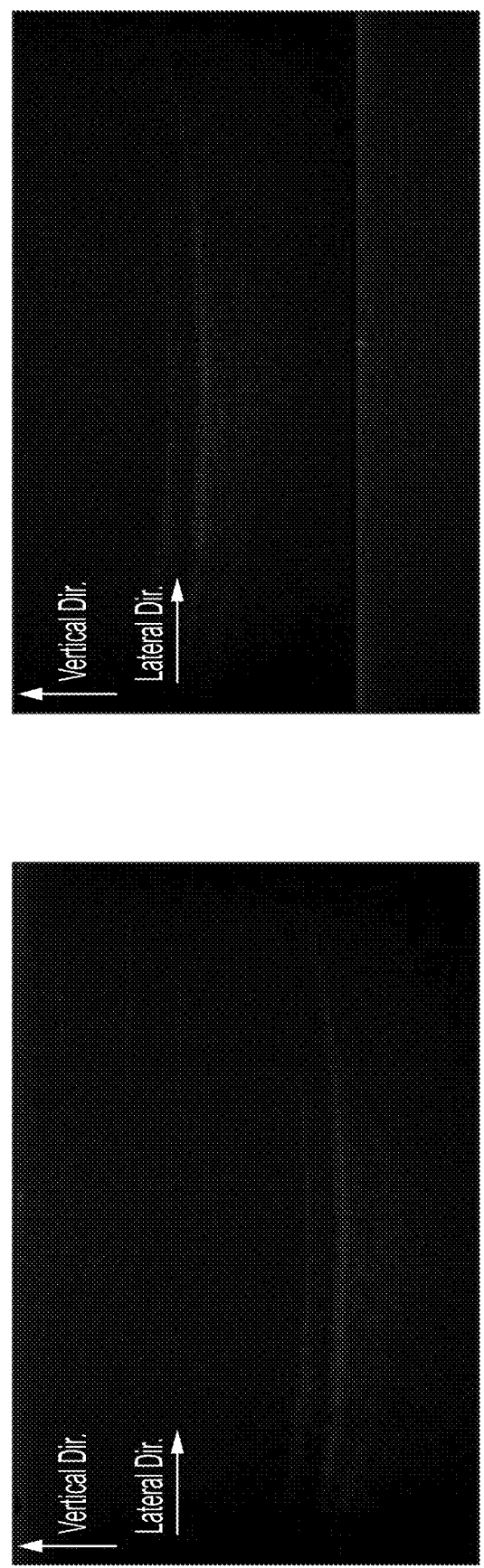
FIG. 12A
FIG. 12B
FIG. 13A
FIG. 13B

DEVICE-ASSISTED EYE IMAGING AND/OR MEASUREMENT

CROSS-REFERENCE TO RELATED APPLICATIONS

This application claims the benefit under 35 U.S.C. § 119(e) of U.S. Provisional Patent Application Ser. No.: 63/127,962, filed on Dec. 18, 2020, and entitled "DEVICE-ASSISTED EYE IMAGING AND/OR MEASUREMENT," which is hereby incorporated herein by reference in its entirety.

FIELD OF THE DISCLOSURE

The present disclosure relates to techniques for imaging and/or measuring a subject's eye, including the subject's retina fundus.

BACKGROUND

Techniques for imaging and/or measuring a subject's eye would benefit from improvement.

SUMMARY OF THE DISCLOSURE

Some aspects of the present disclosure relate to method comprising receiving user input and capturing a medical grade image and/or measurement of the user's eye responsive to receiving the user input.

Some aspects of the present disclosure relate to an imaging and/or measuring apparatus configured to receive user input and capture a medical grade image and/or measurement of the user's eye responsive to receiving the user input.

Some aspects of the present disclosure relate to a method comprising providing, to a user of an imaging and/or measuring apparatus, feedback indicating a location of a subject's eye in a field of view of the imaging and/or measuring apparatus.

Some aspects of the present disclosure relate to an imaging and/or measuring apparatus configured to provide feedback to a user indicating a location of a subject's eye in field of the imaging and/or measuring apparatus.

Some aspects of the present disclosure relate to a method comprising selectively illuminating a first portion of a subject's eye with illumination light and capturing an image of the first portion of the subject's eye.

Some aspects of the present disclosure relate to an imaging and/or measuring apparatus configured to selectively illuminate a first portion of a subject's eye with illumination light and capture an image of the first portion of the subject's eye.

Some aspects of the present disclosure relate to a method comprising localizing a first portion of a subject's eye using first illumination light and capturing an image and/or measurement of a second portion of the subject's eye using second illumination light.

Some aspects of the present disclosure relate to an imaging and/or measuring apparatus configured to localize a first portion of a subject's eye using first illumination light and capture an image and/or measurement of a second portion of the subject's eye using second illumination light.

Some aspects of the present disclosure relate to a method comprising compensating for misalignment between first and second scans of a subject's eye captured by an imaging and/or measuring device.

Some aspects of the present disclosure relate to a method of manufacturing an imaging and/or measuring apparatus, the method comprising configuring the imaging and/or measuring apparatus to provide, to a user of the imaging and/or measuring apparatus, feedback indicating a location of a subject's eye in a field of view of the imaging and/or measuring apparatus.

Some aspects of the present disclosure relate to a method of manufacturing an imaging and/or measuring apparatus, the method comprising configuring the imaging and/or measuring apparatus to selectively illuminate a first portion of a subject's eye with illumination light and capture an image and/or measurement of the first portion of the subject's eye.

The foregoing summary is not intended to be limiting. Moreover, various aspects of the present disclosure may be implemented alone or in combination with other aspects.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 6A is a schematic view of the white light and fluorescence imaging components of FIG. 5 with fixation components, according to some embodiments.

FIG. 6E is a front view of a plate with an annular window of the white light and fluorescence imaging components of FIG. 6A, according to some embodiments.

FIG. 6F is a front view of a plate with an obscuration of the white light and fluorescence imaging components of FIG. 6A, according to some embodiments.

FIG. 6G is a front view of a illumination mirror of the white light and fluorescence imaging components of FIG. 6A, according to some embodiments.

FIG. 7 is a view of the fixation display of FIG. 6A from the perspective of a user of the imaging apparatus comprising the white light and fluorescence imaging components, according to some embodiments.

FIG. 9B is a front view of the mask X of FIG. 9A, according to some embodiments.

FIG. 9C is a front view of the beam splitter Y of FIG. 9A, according to some embodiments.

FIG. 12A shows an exemplary progression of scans relative to a subject's eye, according to some embodiments.

FIG. 12B shows an image constructed using the scans captured in the progression of FIG. 12A, according to some embodiments.

FIG. 13A shows an exemplary progression of scans relative to a subject's eye in which compensation has been provided for misalignment between ones of the scans, according to some embodiments.

FIG. 13B shows an image constructed using the scans captured in the progression of FIG. 13A, according to some embodiments.

DETAILED DESCRIPTION

I. Introduction

Figure 1A:
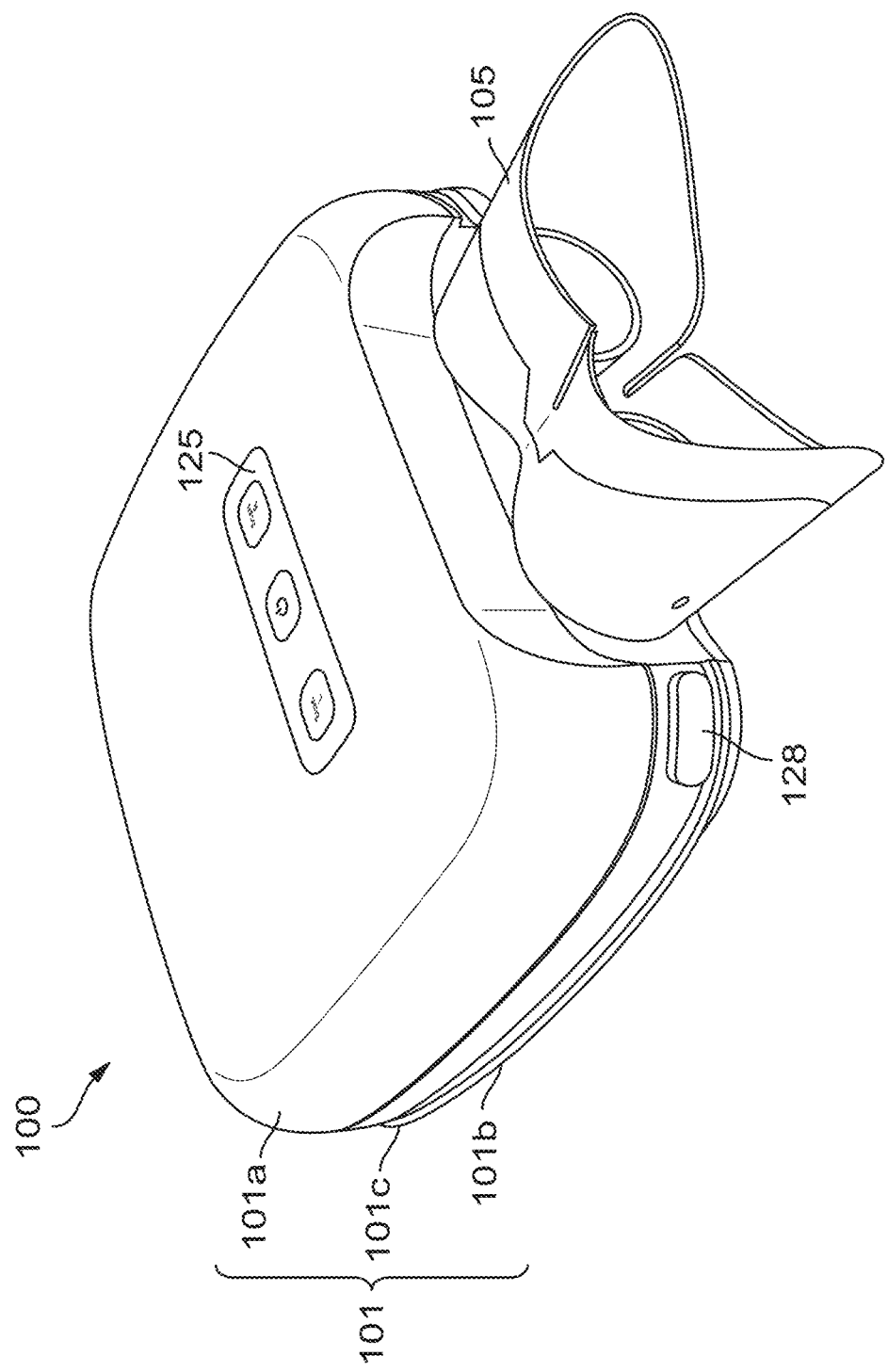
FIG. 1A is a top perspective view of an exemplary imaging apparatus, according to some embodiments.

Aspects of the present disclosure provide improved techniques to assist in imaging a subject's eye that are suitable for use in an imaging apparatus operated by the subject (and/or a clinician, technician, and/or doctor). Some aspects relate to techniques for receiving user input and capturing a medical grade image and/or measurement of a subject's eye responsive to receiving the user input. Some aspects relate to techniques for providing visual feedback to a user of an imaging and/or measuring apparatus indicating a location of the subject's eye in a field of view of the imaging and/or measuring apparatus. Some aspects relate to techniques for illuminating a first portion of a subject's eye with illumination light and substantially blocking the illumination light from reaching a second portion of the subject's eye. Some aspects relate to techniques for localizing a first portion of a subject's eye using light from a first light source and capturing an image of a second portion of a subject's eye using light from a second light source. Some aspects relate to techniques for compensating for misalignment between first and second scans of a subject's eye. Imaging and/or measuring apparatuses and techniques described herein provide medical grade imaging quality and may be produced or conducted by a subject being imaged even in the absence of a clinician or technician, thereby improving access to medical grade imaging. As described herein, a medical grade image may be an image of a part of a subject's anatomy (e.g., the subject's eye) that is useful for determining and/or diagnosing a health condition and/or disease of the subject.

The inventors have recognized and appreciated that a person's eyes provide a window into the body that may be used to not only to determine whether the person has an ocular disease, but to determine the general health of the person. The retina fundus in particular can provide valuable information via imaging for use in various health determinations. However, conventional systems of imaging the fundus only provide superficial information about the subject's eye and cannot provide sufficient information to diagnose certain diseases. Accordingly, in some embodiments, multiple modes of imaging are used to more fully image the fundus of a subject. For example, two or more techniques may be used to simultaneously image the fundus. In some embodiments, the techniques of optical imaging, fluorescence imaging, and optical coherence tomography may be used to provide multimodal imaging of the fundus. The inventors have recognized that by using multimodal imaging, as compared to conventional, unimodal imaging, a greater amount of information may be obtained about the fundus than that may be used to determine the health of the subject. In some embodiments, two or more of optical imaging, optical coherence tomography (OCT), fluorescence spectral imaging, and fluorescence lifetime imaging (FLI) may be used to provide multimodal images of the fundus. By way of example, a device that jointly uses color optical imaging, infrared (IR) imaging, OCT, fluorescence spectral imaging, and FLI provides five modes of imaging the fundus.

It should be appreciated that fluorescence imaging and/or measuring techniques described herein may include exciting naturally luminescent molecules in the subject's eye and/or luminescent molecules in one or more dyes placed in the subject's eye prior to and/or during imaging and/or measurement. Moreover, OCT imaging and/or measuring techniques described herein may alternatively or additionally include doppler OCT techniques and/or OCT angiography (OCT-A) techniques.

The inventors have further recognized and appreciated that making the device portable, handheld, and affordable would have the greatest impact on global health. Countries or regions that cannot afford specialized facilities for diagnosing certain diseases and/or do not have the medical specialists to analyze data from imaging tests are often left behind to the detriment of the overall health of the population. A portable device that may be brought to any low-income community allowing greater access to important healthcare diagnostics. Accordingly, some embodiments are directed to an apparatus that includes multiple modes of imaging the fundus within a housing that is portable and, in some examples, handheld. In some embodiments, the apparatus has a binocular form factor such that a subject may hold the apparatus up to the eyes for fundus imaging. In some embodiments, one or more of the modes of imaging may share optical components to make the apparatus more compact, efficient, and cost effective. For example, a color optical imaging device and a fluorescence imaging device may be housed in a first half of the binocular housing of the apparatus and the OCT device may be housed in the second half of the binocular housing.

Using such an apparatus, both eyes of the subject may be imaged simultaneously using the different devices. For example, the subject's left eye may be imaged using the optical imaging device and/or the fluorescence imaging device while the subject's right eye is imaged using the OCT device. After the initial imaging is complete, the subject can reverse the orientation of the binocular apparatus such that each eye is then measured with the devices disposed in the other half of the binocular housing, e.g., the left eye is imaged using the OCT device and the right eye is imaged using the optical imaging device and/or the fluorescence imaging device. To ensure the apparatus can operate in both orientations, the front surface of the apparatus that is placed near the subject's eyes may be substantially symmetric. Additionally or alternatively, the two halves of the apparatus's housing may be connected by a hinge that allows the two halves to be adjusted to be either orientation.

The inventors have further recognized and appreciated that conventional eye imaging apparatuses are not suitable for use by a subject to image the subject's own eyes. For example, conventional imaging apparatuses are typically used in clinical settings where a clinician or technician can instruct the subject where to position the subject's eyes before, during, and after imaging. When the clinician or technician is satisfied with the subject's positioning, an image of the subject's eye may be captured. When a sequence of images is to be captured, such as a sequence of OCT scans, the subject may use an OCT device that is securely positioned to prevent movement of the OCT device during the scan sequence. The clinician or technician may restart the scan sequence if the subject moves during the sequence. However, when a clinician or technician is not present, most subjects are not capable of positioning themselves properly or knowing when to capture images. When not positioned properly, some portions of the subject's eye can reflect illumination light during imaging and degrade the quality of the captured images. Moreover, when using a portable device, a subject's eye may move relative to the device, thereby destabilizing an OCT scan sequence while it is being captured.

To address these problems, the inventors have developed techniques that facilitate imaging of a subject's eye performed by the subject. In some embodiments, an imaging and/or measuring apparatus described herein may be configured to localize and capture an image of a portion of a subject's eye. For example, the imaging and/or measuring apparatus may be configured to localize and capture an image of one or more portions of interest of the subject's eye, such as portions of the subject's pupil. In the same or another example, the imaging and/or measuring apparatus may be configured to localize undesired portions of the subject's eye, such as the subject's cornea or iris, such that the undesired portions are not imaged. In some embodiments, the imaging and/or measuring apparatus may be configured to illuminate the subject's eye with light first illumination light (e.g., infrared light) to localize a first portion of the subject's eye (e.g., the cornea or iris) and illuminate a second portion of the subject's eye with second illumination light (e.g., white light) to capture an image of the second portion. For example, the imaging and/or measuring device may be configured to determine the location of the first portion using light reflected by the first portion when illuminated. By localizing and capturing images of portions of a subject's eye, an imaging apparatus may be configured to capture higher quality medical grade images of the subject's eye even when operated by a novice user (e.g., in the absence of a clinician or technician).

In some embodiments, an imaging and/or measuring device described herein may be configured to adjust one or more light sources to selectively illuminate one or more first portions of a subject's eye with illumination light and capture an image of the first portion of the subject's eye. For example, the first portion(s) may include portions of the subject's pupil. In some embodiments, the imaging and/or measuring device may include at least one light source configured to provide the illumination light and optical components configured to focus the illumination light on the first portion of the subject's eye. For example, the light source(s) may include multiple light sources configured to illuminate various portions of the subject's eye. For instance, one or more groups of light sources may be positioned to illuminate respective portions of the subject's eye, such as having the light sources arranged in a ring and configured to illuminate a corresponding ring on the subject's eye. In some embodiments, optical component(s) may include a plate having an annulus and an obscuration in a center of the annulus such that the light source(s) are configured to illuminate the first portion(s) through the annulus, as described further herein. By selectively illuminating and imaging one or more portions of the subject's eye, the imaging and/or measuring apparatus may only illuminate portions of the subject's eye desired for imaging, thereby preventing reflections from undesired portions from degrading the quality of images captured of the selected portions of subject's eye.

In some embodiments, an imaging and/or measuring device described herein may be configured to provide feedback to a user of the imaging and/or measuring apparatus indicating a location of a subject's eye in a field of view of the imaging and/or measuring apparatus. In some embodiments, the user may be the subject. For example, whereas in conventional systems, a user of an imaging apparatus can only be a technician or clinician, the user of an imaging and/or measuring apparatus described herein may be the subject being imaged. In some embodiments, imaging and/or measuring apparatus may be configured to localize the subject's eye in the field of view of the imaging and/or measuring apparatus and provide the visual feedback responsive to localizing the subject's eye. For example, the imaging and/or measuring apparatus may determine that the subject's eye is not positioned within a threshold range of a target position (e.g., a target distance from an imaging and/or measuring device of the imaging and/or measuring apparatus to the subject's eye) and provide feedback to cause the user to reposition the subject's eye. In some embodiments, fixation display components of the imaging and/or measuring apparatus may be configured to display visual feedback to the user. By providing visual feedback to a user, the imaging and/or measuring apparatus may facilitate operation of the apparatus by even a novice user.

In some embodiments, an imaging and/or measuring apparatus may be configured to compensate for misalignment between scans of a subject's eye. For example, the imaging and/or measuring apparatus may include an OCT imaging and/or measuring device configured to compensate for the misalignment, such as by adjusting a reference path length and/or a positioning of a scanning mirror of the OCT imaging and/or measuring device, and/or by providing feedback to a user (e.g., an operator and/or the subject) for the user to compensate for the misalignment. By compensating for misalignment between scans of a subject's eye, an imaging and/or measuring apparatus may capture high quality medically useful images of the subject's eye even when the subject's eye and/or the imaging and/or measuring apparatus moves during a scan sequence.

According to techniques described above and further herein, imaging and/or measuring apparatuses may be used by a subject to image the subject's own eye(s). In some embodiments, an imaging and/or measuring apparatus described herein may be configured to receive user input and capture a medical grade image and/or measurement of the subject's eye responsive to receiving the user input. For example, the user may be subject being imaged by the imaging and/or measuring apparatus. In some embodiments, the user input may be provided using one or more buttons of the imaging apparatus. In some embodiments, the image apparatus may include one or more imaging and/or measuring devices such as an OCT device, an IR device, an FLI device, and/or a white light device.

It should be appreciated that techniques described herein may be implemented alone or in any combination. It should also be appreciated that techniques described herein may be used in imaging and/or measuring apparatuses that are not necessarily operated by the subject to image the subject's own eyes. For example, techniques described herein may be used in imaging apparatuses configured for conventional settings such as hospitals and clinics for use that is assisted by one or more clinicians and/or technicians, as embodiments described herein is not so limited.

II. Exemplary Imaging and/or Measuring Apparatuses and Components

Figure 1B:
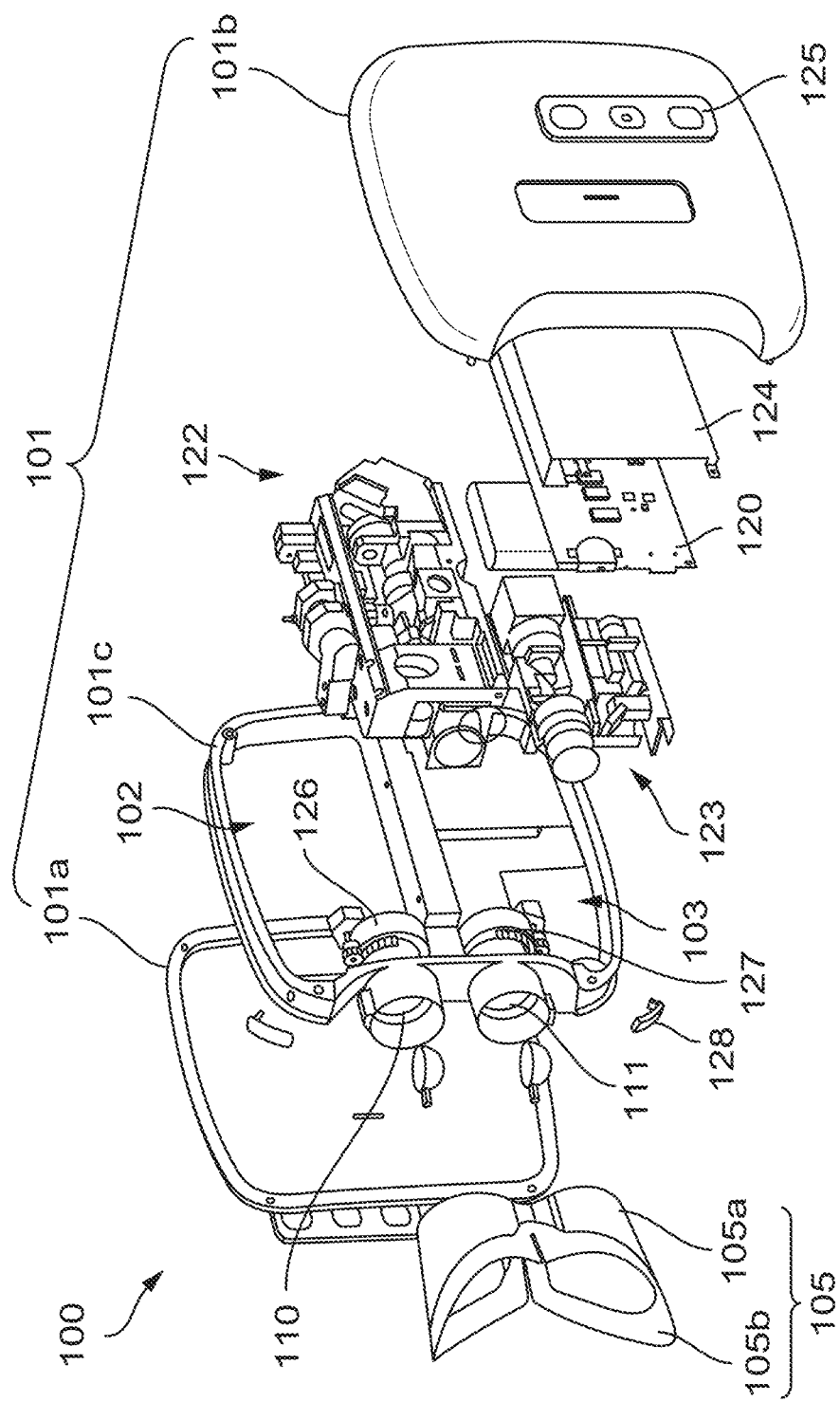
FIG. 1B is an exploded view of the imaging apparatus of FIG. 1A, according to some embodiments.
Figure 1C:
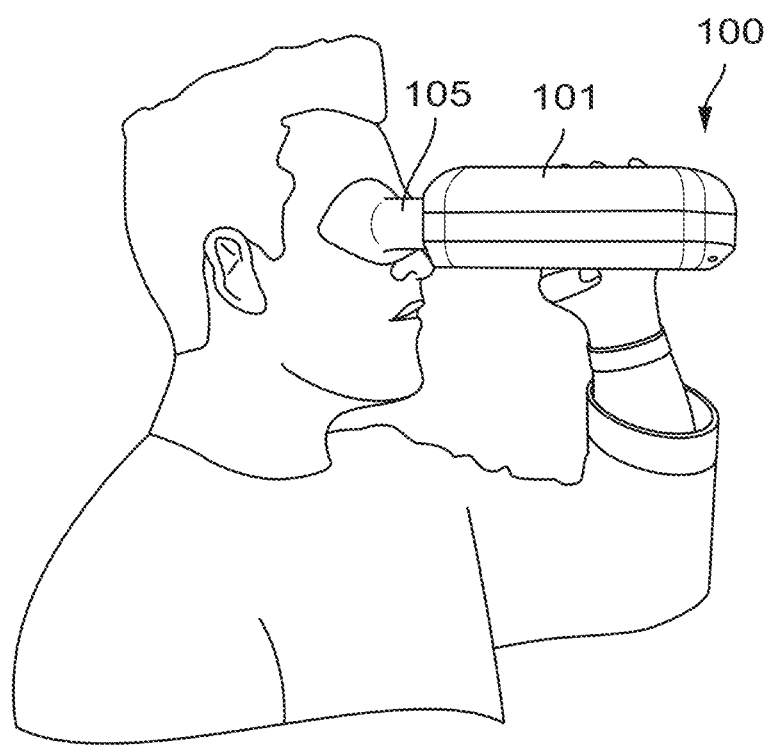
FIG. 1C is a side view of a user operating the imaging apparatus of FIG. 1A, according to some embodiments.
Figure 1D:
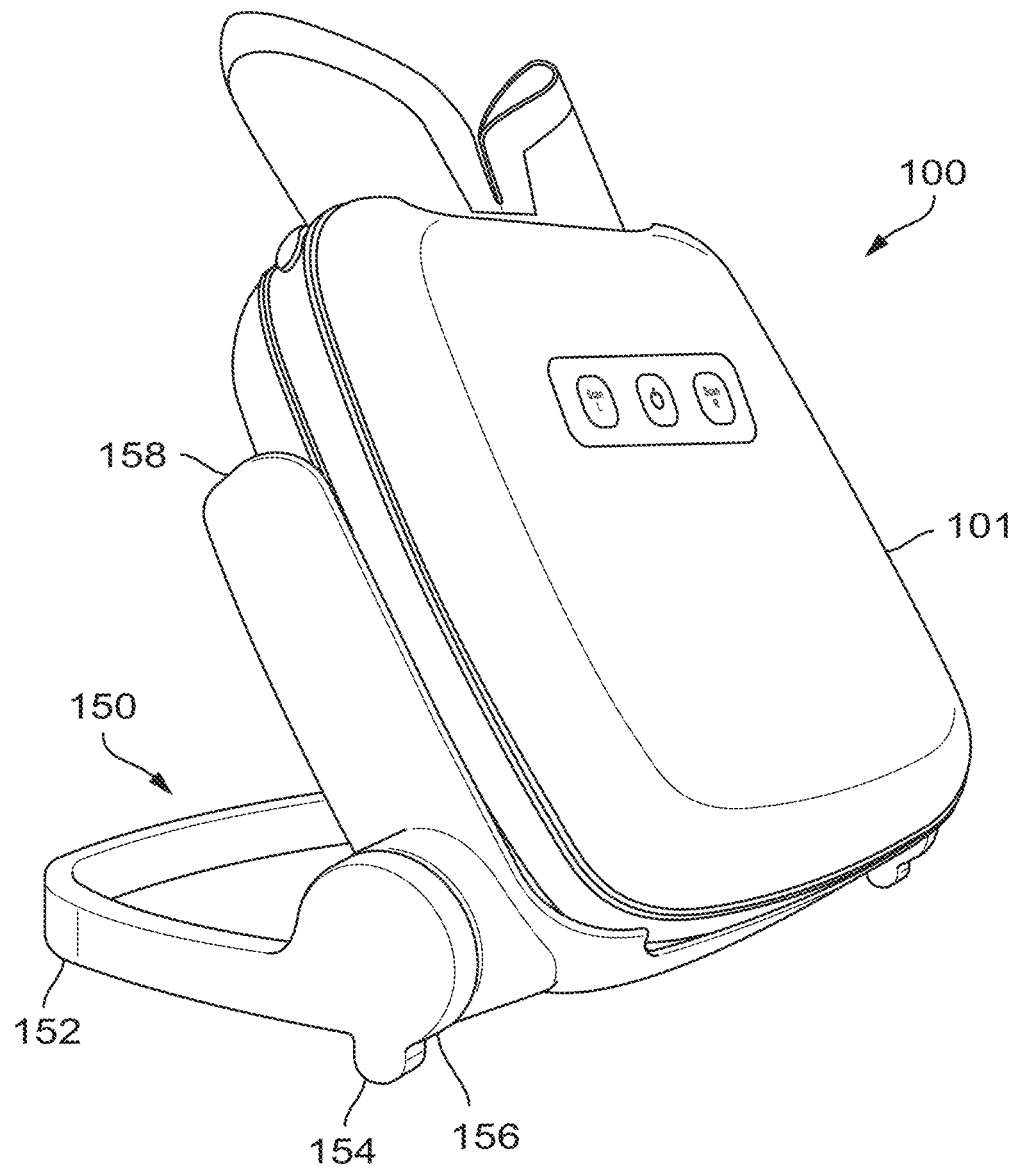
FIG. 1D is a side perspective view of the imaging apparatus of FIG. 1A seated in a stand, according to some embodiments.
Figure 1E:
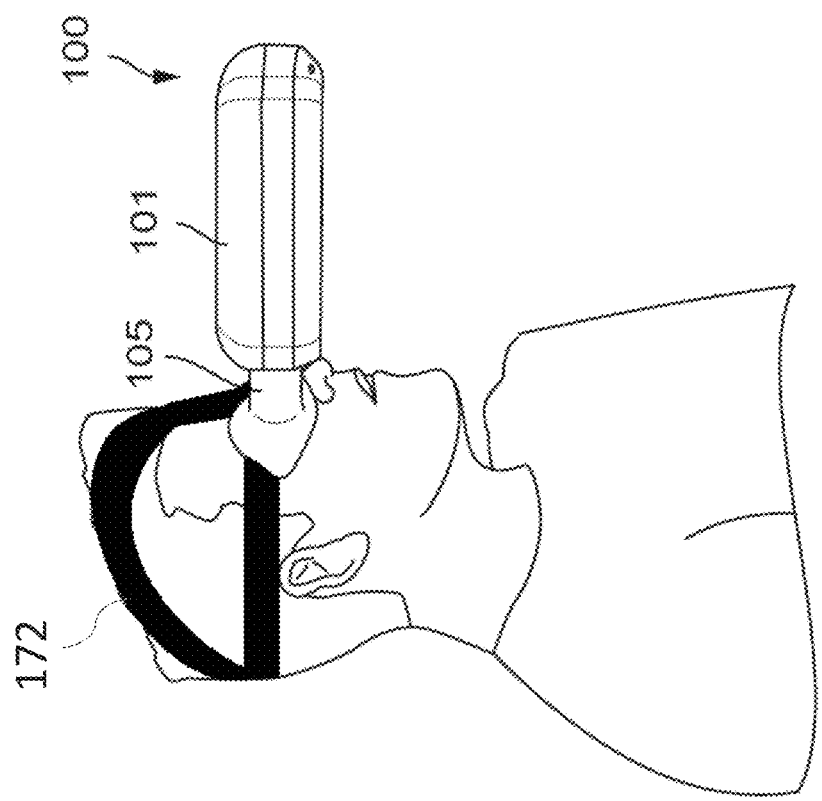
FIG. 1E is a side perspective view of a user operating the imaging apparatus of FIG. 1A while the imaging apparatus is mounted on the user's head, according to some embodiments.
Figure 1F:
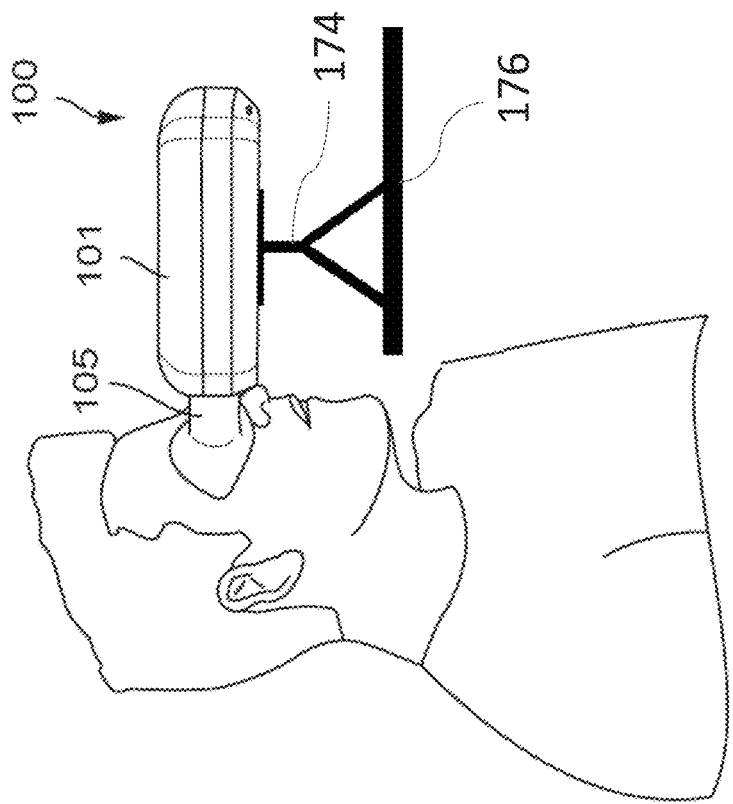
FIG. 1F is a side perspective view of the imaging apparatus of FIG. 1A while the imaging apparatus is mounted on a surface, according to some embodiments.

FIGS. 1A-1F illustrate an exemplary embodiment of an imaging (and/or measuring) apparatus 100, according to some embodiments. As shown in FIG. 1A, imaging apparatus 100 has a housing 101, including multiple housing portions 101a, 101b, and 101c. Housing portion 101a has a control panel 125 including multiple buttons for turning imaging apparatus 100 on or off, and for initiating scan sequences. FIG. 1B is an exploded view of imaging apparatus 100 illustrating components disposed within housing 101, such as imaging (and/or measuring) devices 122 and 123 and electronics 120. Imaging devices 122 and 123 may include one or more of: white light imaging components, fluorescence imaging components, infrared (IR) imaging components, and/or OCT imaging components, in accordance with various embodiments. In one example, imaging device 122 may include OCT imaging components and/or IR imaging components, and imaging device 123 may include white light imaging components and/or fluorescence imaging components. In some embodiments, imaging device 122 and/or 123 may include fixation components configured to display a visible fixation object to a user's the imaging apparatus 100. Imaging apparatus 100 further includes front housing portion 105 configured to receive a person's eyes for imaging, as illustrated, for example, in FIG. 1C. FIG. 1D illustrates imaging apparatus 100 seated in stand 150. FIG. 1E illustrates imaging apparatus 100 mounted to a subject's head. FIG. 1F illustrates imaging apparatus 100 mounted on a surface.

As shown in FIGS. 1A-1F, housing portions 101a and 101b may substantially enclose imaging apparatus 100, such as by having all or most of the components of imaging apparatus 100 disposed between housing portions 101a and 101b. Housing portion 101c may be mechanically coupled to housing portions 101a and 101b, such as using one or more screws fastening the housing 101 together. As illustrated in FIG. 1B, housing portion 101c may have multiple housing portions therein, such as housing portions 102 and 103 for accommodating imaging devices 122 and 123. For example, in some embodiments, the housing portions 102 and 103 may be configured to hold imaging devices 122 and 123 in place. Housing portion 101c is further includes a pair of lens portions in which lenses 110 and 111 are disposed. Housing portions 102 and 103 and the lens portions may be configured to hold imaging devices 122 and 123 in alignment with lenses 110 and 111. Housing portions 102 and 103 may accommodate focusing parts 126 and 127 for adjusting the foci of lenses 110 and 111. Some embodiments may further include securing tabs 128. By adjusting (e.g., pressing, pulling, pushing, etc.) securing tabs 128, housing portions 101a, 101b, and/or 101c may be decoupled from one another, such as for access to components of imaging apparatus 100 for maintenance and/or repair purposes. As shown in FIG. 1B, electronics 120 of imaging apparatus 100 may be configured to perform imaging, measuring, and/or associated processing. In some embodiments, electronics 120 may include one or more processors, such as for analyzing data captured using the imaging devices. In some embodiments, electronics 120 may include wired and/or wireless means of electrically communicating to other devices and/or computers, such as a mobile phone, desktop, laptop, or tablet computer, and/or smart watch. For example, electronics 120 of imaging apparatus 100 may be configured for establishing a wired and/or wireless connection to such devices, such as by USB and/or a suitable wireless network. In some embodiments, housing 101 may include one or more openings to accommodate one or more electrical (e.g., USB) cables. In some embodiments, housing 101 may have one or more antennas disposed thereon for transmitting and/or receiving wireless signals to or from such devices. In some embodiments, imaging devices 122 and/or 123 may be configured for interfacing with the electrical cables and/or antennas. In some embodiments, electronics 120 may be configured to process captured image data based on instructions received from such communicatively coupled devices or computers. In some embodiments, imaging apparatus 100 may initiate an image capture sequence based on instructions received from a devices and/or computers communicatively coupled to imaging apparatus 100. In some embodiments, devices and/or computers communicatively coupled to imaging apparatus 100 may process image data captured by imaging apparatus 100.

Control panel 125 may be electrically coupled to electronics 120. For example, the scan buttons of control panel 125 may be configured to communicate an image capture and/or scan command to electronics 120 to initiate a scan using imaging device 122 and/or 123. As another example, the power button of control panel 125 may be configured to communicate a power on or power off command to electronics 120. As illustrated in FIG. 1B, imaging apparatus 100 may further include electromagnetic shielding 124 configured to isolate electronics 120 from sources of electromagnetic interference (EMI) in the surrounding environment of imaging apparatus 100. Including electromagnetic shielding 124 may improve operation (e.g., noise performance) of electronics 120. In some embodiments, electromagnetic shielding 124 may be coupled to one or more processors of electronics 120 to dissipate heat generated in the one or more processors.

As shown in FIG. 1C, for example, during operation of the imaging apparatus 100, a person using the imaging apparatus 100 may place the front housing section 105 against the person's face such that the person's eyes are aligned with the lens portions of imaging apparatus 100. In some embodiments, the imaging apparatus 100 may include a gripping member (not shown) coupled to the housing 101 and configured for gripping by a person's hand. In some embodiments, the gripping member may be formed using a soft plastic material, and may be ergonomically shaped to accommodate the person's fingers. For instance, the person may grasp the gripping member with both hands and place the front housing section 105 against the person's face such that the person's eyes are in alignment with the lens portions.

In some embodiments, imaging apparatus described herein may be configured for mounting to a stand, as illustrated in the example of FIG. 1D. In FIG. 1D, imaging apparatus 100 is supported by stand 150, which includes base 152 and holding portion 158. Base 152 is illustrated including a substantially U-shaped support portion and has multiple feet 154 attached to an underside of the support portion. Base 152 may be configured to support imaging apparatus 100 above a table or desk, such as illustrated in the figure. Holding portion 158 may be shaped to accommodate housing 101 of imaging apparatus 100. For example, an exterior facing side of holding portion 158 may be shaped to conform to housing 101.

As illustrated in FIG. 1D, base 152 may be coupled to holding portion 158 by a hinge 156. Hinge 156 may permit rotation about an axis parallel to a surface supporting base 152. For instance, during operation of imaging apparatus 100 and stand 150, a person may rotate holding portion 158, having imaging apparatus 100 seated therein, to an angle comfortable for the person to image one or both eyes. For example, the person may be seated at a table or desk supporting stand 150. In some embodiments, a person may rotate imaging apparatus 100 about an axis parallel to an optical axis along which imaging devices within imaging apparatus image the person's eye(s). For instance, in some embodiments, stand 150 may alternatively or additionally include a hinge parallel to the optical axis.

In some embodiments, holding portion 158 (or some other portion of stand 150) may include charging hardware configured to transmit power to imaging apparatus 100 through a wired or wireless connection. In one example, the charging hardware in stand 150 may include a power supply coupled to one or a plurality of wireless charging coils, and imaging apparatus 100 may include wireless charging coils configured to receive power from the coils in stand 150. In another example, charging hardware in stand 150 may be coupled to an electrical connector on an exterior facing side of holding portion 158 such that a complementary connector of imaging apparatus 100 interfaces with the connector of stand 150 when imaging apparatus 100 is seated in holding portion 158. In accordance with various embodiments, the wireless charging hardware may include one or more power converters (e.g., AC to DC, DC to DC, etc.) configured to provide an appropriate voltage and current to imaging apparatus 100 for charging. In some embodiments, stand 150 may house at least one rechargeable battery configured to provide the wired or wireless power to imaging apparatus 100. In some embodiments. Stand 150 may include one or more power connectors configured to receive power from a standard wall outlet, such as a single-phase wall outlet.

In some embodiments, front housing portion 105 may include multiple portions 105a and 105b. Portion 105a may be formed using a mechanically resilient material whereas front portion 105b may be formed using a mechanically compliant material, such that front housing portion 105 is comfortable for a user to wear. For example, in some embodiments, portion 105a may be formed using plastic and portion 105b may be formed using rubber or silicone. In other embodiments, front housing portion 105 may be formed using a single mechanically resilient or mechanically compliant material. In some embodiments, portion 105b may be disposed on an exterior side of front housing portion 105, and portion 105a may be disposed within portion 105b.

In some embodiments, imaging apparatus 100 may be supported by a mount configured to be positioned on a part of a subject. For example, as shown in FIG. 1E, imaging apparatus 100 is mounted on the subject's head by straps 172. In some embodiments, mounting components such as straps 172 may be mechanically secured to one or more locations on imaging apparatus 100. It should be appreciated that other forms of mounting components may be used, such as goggles and/or a face mask configured to attach to imaging apparatus 100. In some embodiments, the mounting components may be manually adjustable such that the subject can move imaging apparatus 100 in one or more directions. In some embodiments, the mounting components may be automatically adjustable, such as including a motor configured to move imaging apparatus 100 in one or more directions. For example, after locating a position of one or more portions of the subject's eye such as described herein, imaging apparatus 100 may be configured to move in various directions before and/or during imaging to accommodate a position of the subject's eye.

In some embodiments, imaging apparatus may be supported by a mount configured to be positioned on a surface. For example, as shown in FIG. 1F, imaging apparatus 100 is mounted on a surface 176 by stand 174. In some embodiments, surface 176 may be a top surface of a table or desk, a ceiling surface (e.g., imaging apparatus 100 may hang from an upper surface), or a floor surface. In some embodiments, imaging apparatus 100 may be secured to stand 174 at multiple locations of imaging apparatus 100. In some embodiments, stand 174 may be manually adjustable such that the subject can move imaging apparatus 100 in one or more directions. In some embodiments, stand 174 may be automatically adjustable, such as including a motor configured to move imaging apparatus 100 in one or more directions as described in connection with FIG. 1E.

Figure 2A:
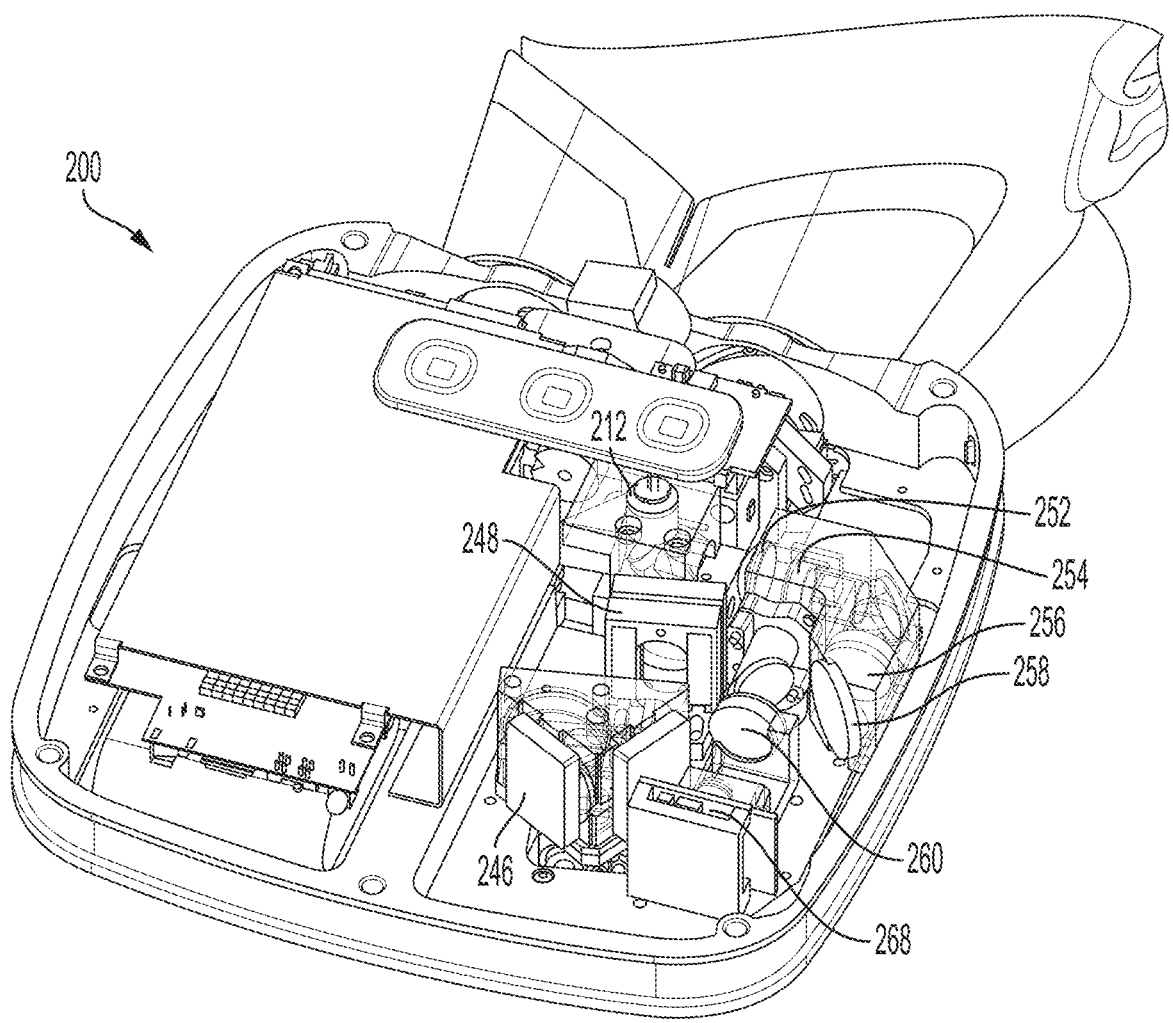
FIG. 2A is a top perspective view of an imaging apparatus with a housing portion removed to show optical coherence tomography (OCT) imaging components of the imaging apparatus, according to some embodiments.
Figure 2B:
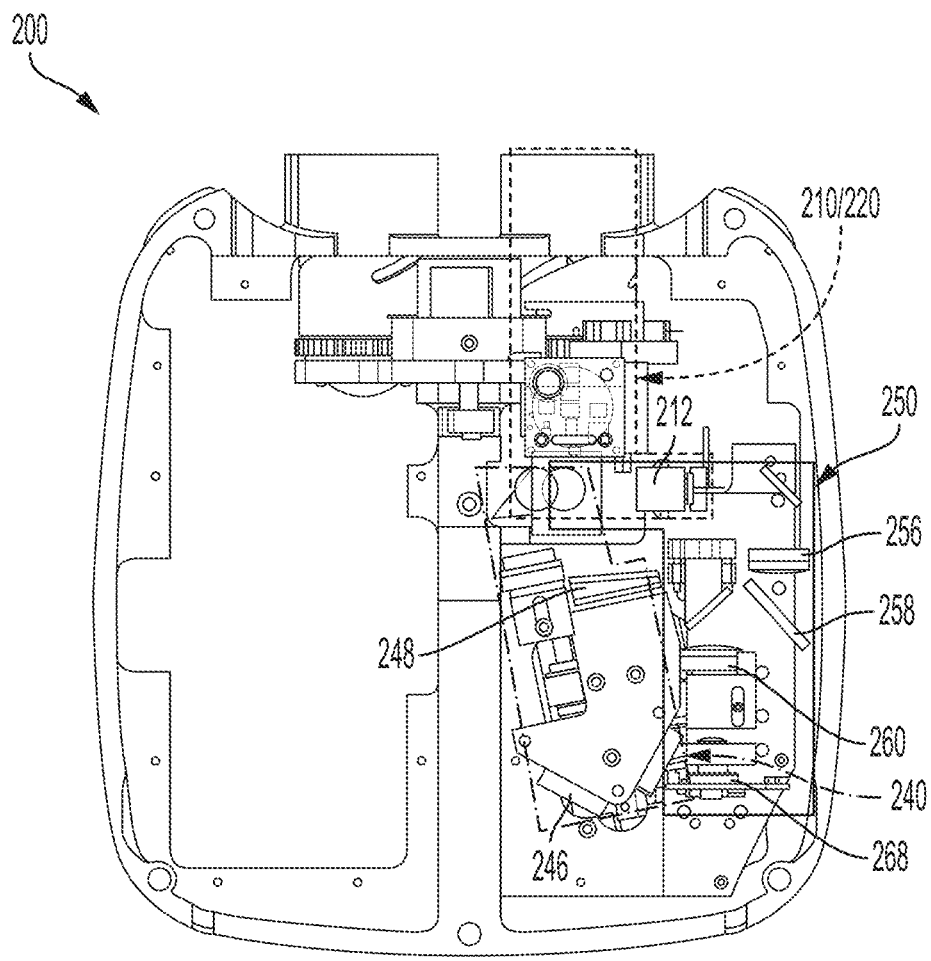
FIG. 2B is a top view of the imaging apparatus of FIG. 2A, according to some embodiments.
Figure 2C:
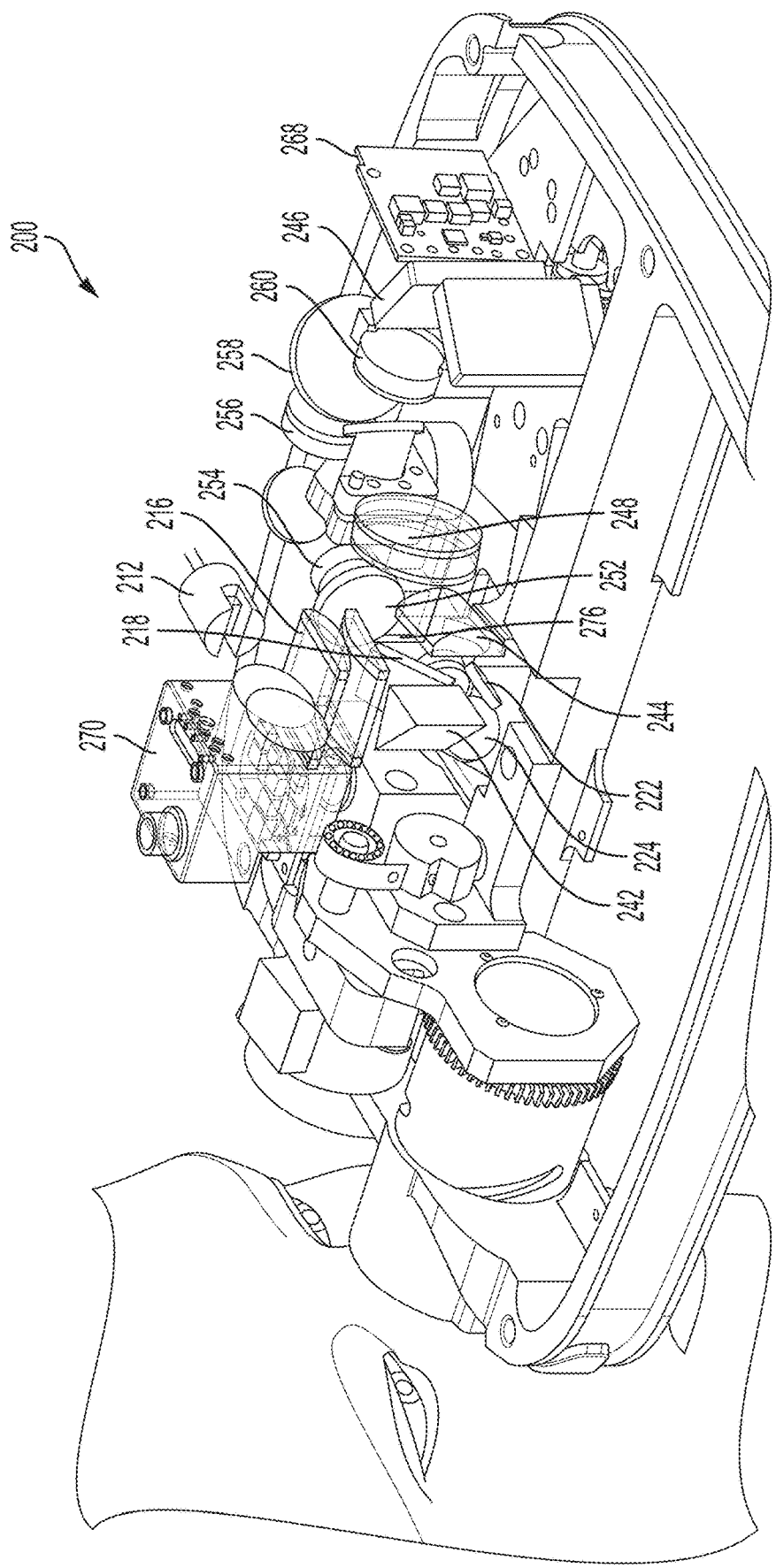
FIG. 2C is a side perspective view of the imaging apparatus of FIG. 2A, according to some embodiments.

FIGS. 2A-2C illustrate an exemplary imaging apparatus 200 comprising OCT source components 210, sample components 220, reference components 240, detection components 250, and fixation display 270, according to some embodiments. FIG. 2A is a top perspective view of imaging apparatus 200 with a housing portion of imaging apparatus 200 removed to show the OCT components of imaging apparatus 200, FIG. 2B is a top view of imaging apparatus 200 in the configuration shown in FIG. 2A, and FIG. 2C is a side perspective view of imaging apparatus 200 in the configuration shown in FIG. 2A.

Source components 210 may be configured to generate and provide light to sample components 220 for focusing on the subject's eye, and to reference components 240 for focusing on one or more reference surfaces of reference components 240. In some embodiments, source components 210 may include one or more sources of light, such as a super-luminescent diode, and optical components configured to focus light from the source(s). Of source components 210, light source 212, cylindrical lenses 216, and beam splitter 218 are shown in FIGS. 2A-2C. Light source 212 may be configured to provide light to beam splitter 218 via cylindrical lenses 216. Beam splitter 218 may be configured to optically couple light from light source 212 to sample components 220 and reference components 240.

In some embodiments, sample components 220 may be configured to provide light from source components 210 to the eye of a subject via one or more optical components, receive reflected light from the subject's eye, and provide the reflected light to detection components 250. Of sample components 220, scanning mirror 222, and fixation dichroic 224 are shown in FIGS. 2A-2C. Scanning mirror 222 may be configured to direct light from beam splitter 218 of source components 210 toward a target portion of the subject's eye. Fixation dichroic 224 may be configured to optically couple light from fixation display 270 to the subject's eye. In FIG. 2C, imaging apparatus 200 is configured to display light from fixation display 270 and from source components 210 to the subject's eye along a same optical path. In some embodiments, sample components 220 may also include an infrared (IR) dichroic configured to couple light from IR imaging components to the subject's eye. For example, the IR imaging components may share at least a portion of the optical path from the IR dichroic to the subject's eye. In some embodiments, source components 210 and sample components 220 may be configured to illuminate a line across the subject's eye in a first direction, and scanning mirror 222 may be configured to scan the line across the subject's eye in a second direction perpendicular to the first direction. For example, the first direction may be a lateral direction and the second direction may be a vertical direction.

In some embodiments, reference components 240 may be configured to provide light from source components 210 to one or more reference surfaces via one or more optical components. Of reference components 240, dispersion compensator 242, cylindrical lens 244, fold mirrors 246, and reference surface 248 are shown in FIGS. 2A-2C. Dispersion compensator 242, cylindrical lens 244, and fold mirrors 246 may be configured to direct and focus light from beam splitter 218 on reference surface 248, and to provide light reflected from reference surface 248 to detection components 250 via beam splitter 218.

In some embodiments, detection components 250 may be configured to receive reflected light from sample components 220 and reference components 240 responsive to providing light from source components 210 to sample components 220 and reference components 240. Of detection components 250, aspherical lens 252, plano-concave lens 254, achromatic lens 256, transmissive grating 258, achromatic lens 260, and imaging sensor 268 are shown in FIGS. 2A-2C. Aspherical lens 252, plano-concave lens 254, and achromatic lenses 256 and 260 may be configured to direct and focus the received light on imaging sensor 268. Transmissive grating 258 may be configured to transmit received light at a Littrow angle, which may enhance the noise performance of the transfer function of imaging sensor 268. Imaging sensor 268 may include an interferometer (e.g., Michelson and/or Mach-Zehnder) configured to determine a phase difference between light received via sample components 220 and light received via reference components 240. In some embodiments, detection components 250 may also include an IR sensor configured to capture IR images using IR light received via sample components 220. In some embodiments, detection components 250 may be configured to generate an image using reflected light from an illuminated line across the subject's eye to indicate depth information along the illuminated line. In some embodiments, as scanning mirror 222 scans the illuminated line across the subject's eye (e.g., in a vertical direction), detection components 250 may be configured to generate images for each scanned line, thereby creating a depth image in two dimensions (e.g., lateral and vertical and/or any other pair of orthogonal dimensions).

Figure 3A:
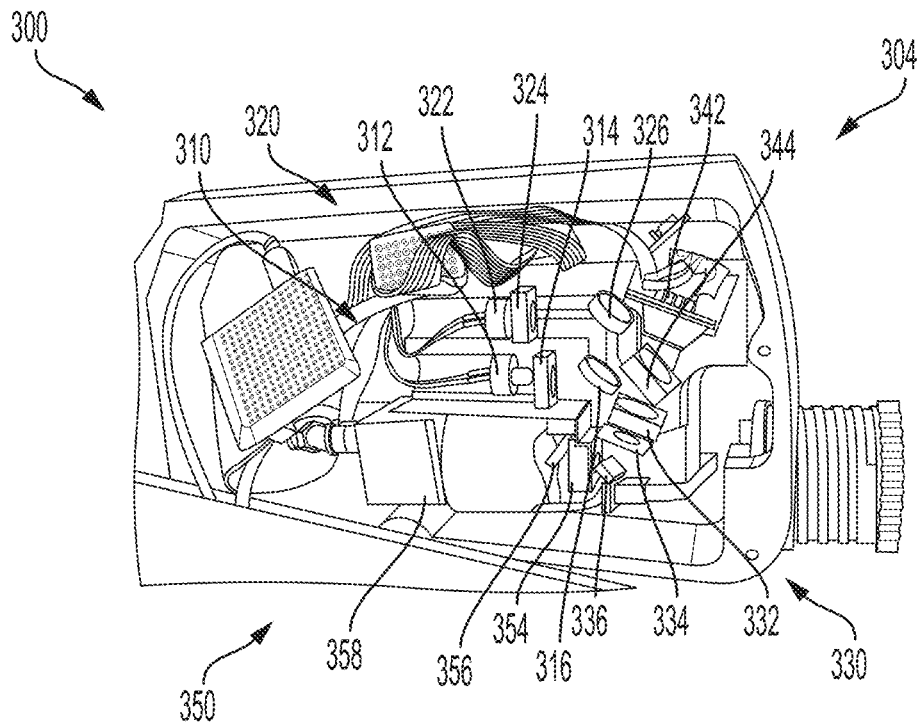
FIG. 3A is a top view of a portion of an exemplary imaging apparatus with a housing portion removed to show white light and fluorescence imaging components of the imaging apparatus, according to some embodiments.
Figure 3B:
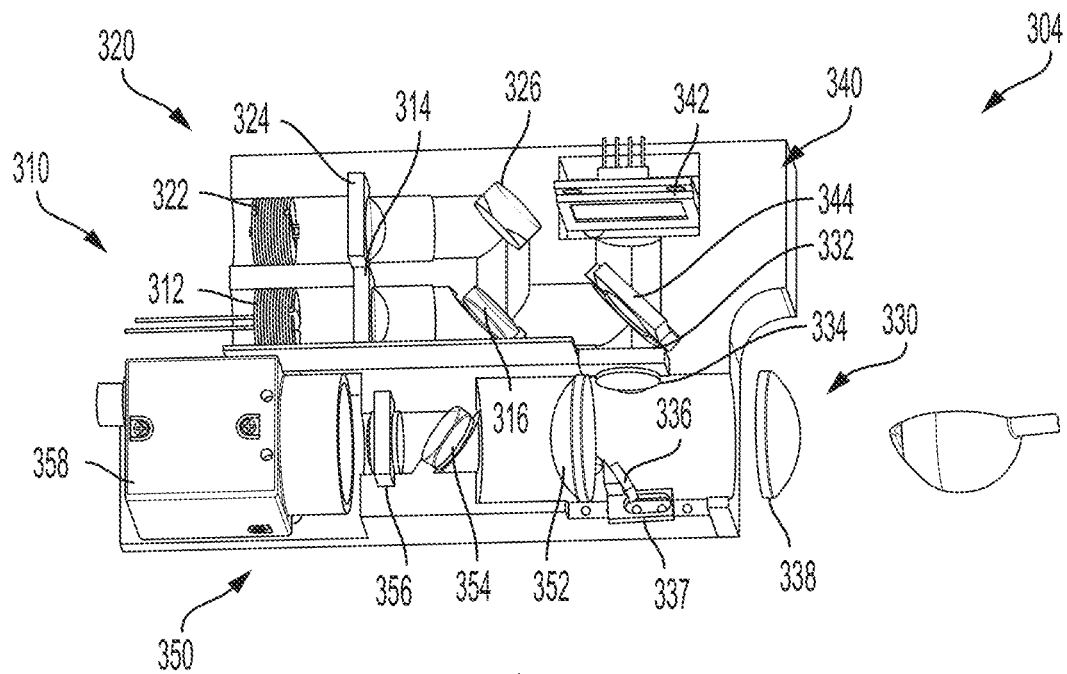
FIG. 3B is a top view of the imaging apparatus of FIG. 3A, according to some embodiments.

FIGS. 3A-3B are top views of white light and fluorescence imaging components 304 of an exemplary imaging apparatus 300, according to some embodiments. FIG. 3A is a top view of a portion of imaging apparatus 300 with a housing portion removed to show white light and fluorescence imaging components 304, according to some embodiments. FIG. 3B is a top view of the imaging apparatus of FIG. 3A, according to some embodiments. As shown in FIGS. 3A-3B, white light and fluorescence imaging components 304 include white light source components 310, excitation source components 320, sample components 330, fixation display 342, and detection components 350. In some embodiments, white light source components 310 and excitation source components 320 may be configured to illuminate the subject's eye via sample components 330 such that reflected and/or fluorescence light from the subject's retina fundus may be imaged using detection components 350. In some embodiments, fixation display 342 may be configured to provide a fixation object for the subject to focus on during imaging.

In some embodiments, white light source components 310 may be configured to illuminate the subject's retina fundus such that light reflected and/or scattered by the retina fundus may be captured and imaged by detection components 350, as described herein. As shown in FIGS. 3A-3B, white light source components 310 include white light source 312, collimating lens 314, and laser dichroic 316. In some embodiments, white light source 312 may include a white light emitting diode (LED). In some embodiments, white light source 312 may include a plurality of color LEDs that combine to substantially cover the visible spectrum, thereby approximating a white light source. In some embodiments, white light source 312 may include one or more blue or ultraviolet (UV) lasers.

In some embodiments, excitation source components 320 may be configured to excite fluorescence in one or more molecules of interest in the subject's retina fundus, such that fluorescence light may be captured by detection components 350. As shown in FIGS. 3A-3B, fluorescence source components include laser 322, collimating lens 324, and mirror 326. In some embodiments, laser 322 may be configured to generate light at one or more wavelengths corresponding to fluorescence characteristics of one or more respective molecules of interest in the subject's retina fundus. In some embodiments, such molecules may be naturally occurring in the retina fundus. In some embodiments, such molecules may be biomarkers configured for fluorescence imaging. For example, laser 322 may be configured to generate excitation light having a wavelength between 405 nm and 450 nm. In some embodiments, laser 322 may be configured to generate light having a bandwidth of 5-6 nm. It should be appreciated that some embodiments may include a plurality of lasers configured to generate light having different wavelengths.

As shown in FIGS. 3A-3B, white light source 312 is configured to generate white light and transmit the white light via collimating lens 314 to laser dichroic 316. Laser 322 is configured to generate excitation light and transmit the excitation light via collimating lens 324 to mirror 326, which reflects the excitation light to laser dichroic 316. Laser dichroic 316 may be configured to transmit white light and reflect excitation light such that the white and excitation light share an optical path to the subject's retina fundus. In some embodiments, laser dichroic 316 may be configured as a long pass filter.

In some embodiments, fixation display 342 may be configured to display a fixation object for the subject to focus on during imaging. Fixation display 342 may be configured to provide fixation light to fixation dichroic 344. In some embodiments, fixation dichroic 344 may be configured to transmit fixation light and to reflect white light and excitation light such that the fixation light, white light, and excitation light all share an optical path from fixation dichroic 344 to the subject's retina fundus.

In some embodiments, sample components 330 may be configured to provide white light and excitation light to the subject's retina fundus and to provide reflected and/or fluorescent light from the subject's retina fundus to detection components 350. As shown in FIGS. 3A-3B, sample components 330 include achromatic lens 332, iris 334, illumination mirror 336, and achromatic lens 338. In some embodiments, achromatic lenses 332 and 338 may be configured to focus the white light, excitation light, and fixation light on the subject's retina fundus. In some embodiments, iris 334 may be configured to scatter some of the white light, excitation light, and/or fixation light such that the light from the different sources focuses on respective portions of the subject's retina fundus. In some embodiments, illumination mirror 336 may be adjustable, such as by moving positioning component 337 in a direction parallel to the imaging axis. In some embodiments, achromatic lens 338 may be further configured to provide reflected and/or fluorescent light from the subject's retina fundus to detection components 350.

Detection components 350 may be configured to focus and capture light from the subject's retina fundus to create an image using the received light. As shown in FIGS. 3A-3B, detection components 350 include achromatic lens 352, dichroic 354, focusing lens 356, and camera 358. In some embodiments, achromatic lens 352 and focusing lens 356 may be configured to focus received light on camera 358 such that camera 358 may capture an image using the received light. In some embodiments, dichroic 354 may be configured to transmit white light and fluorescent light and to reflect excitation light such that the excitation light does not reach camera 358. In some embodiments, camera 358 may be configured to capture white light and fluorescent light. In some embodiments, separate detection components 350 may be included to capture white light and fluorescence images. For example, a dichroic may be positioned in the detection path and configured to convey white light to a white light and/or color camera and fluorescent light to a monochrome camera and/or fluorescence lifetime sensor. In some embodiments, detection components 350 may include a white light camera and a monochrome camera configured to receive light of different wavelengths, such as infrared light at the monochrome camera, and generate fluorescence spectral images (e.g., autofluorescence spectral images) using the light captured by the white light camera and the monochrome camera. In one example, light sources used for autofluorescence imaging may have wavelengths of 490 nm, 520 nm, and/or 636 nm.

Figure 4:
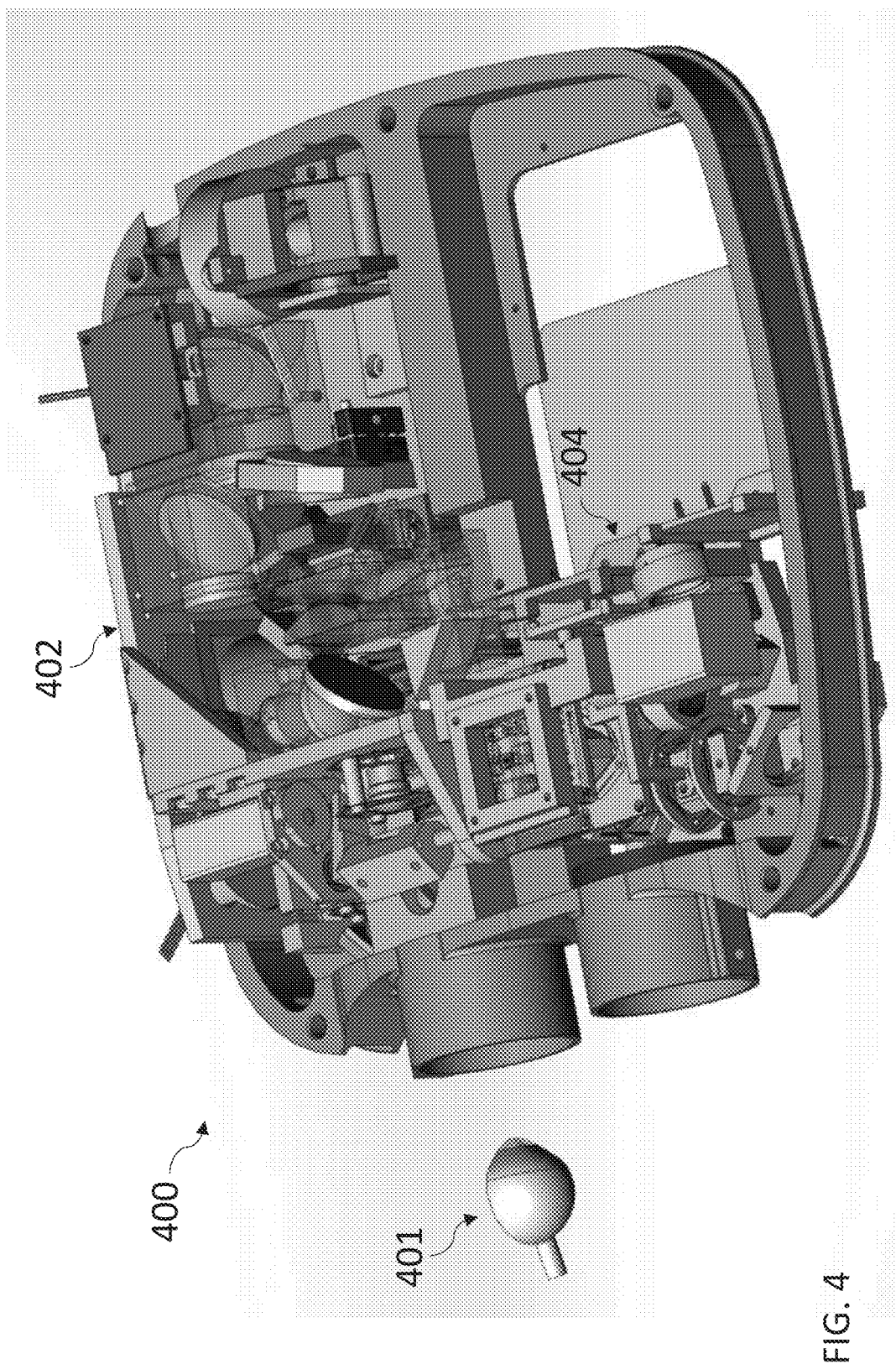
FIG. 4 is a top perspective view of an exemplary imaging apparatus with a housing portion removed to show white light, fluorescence, OCT, and infrared (IR) imaging components of the imaging apparatus, according to some embodiments.

FIG. 4 is a top perspective view of an exemplary imaging apparatus 400 with a housing portion removed to show OCT and infrared (IR) imaging components 402 and white light and fluorescence imaging components 404, according to some embodiments. Imaging apparatus 400 may be configured to image each of a subject's eyes using two or more imaging devices. For example, in FIG. 4, OCT and IR imaging components 402 are positioned on the side of imaging apparatus 400 and configured to image the subject's left eye 401 via an eye portion aligned with the subject's left eye 401, and white light and fluorescence imaging components 404 are positioned on the other side of imaging apparatus 400 and configured to image the subject's right eye (not shown) via an eye portion aligned with the subject's right eye. In some embodiments, OCT and IR imaging components may be configured in the manner described for the OCT components of FIGS. 2A-2C. In some embodiments, white light and fluorescence imaging components 404 may be configured in the manner described for white light and fluorescence imaging components 304 in connection with FIGS. 3A-3B.

Figure 5:
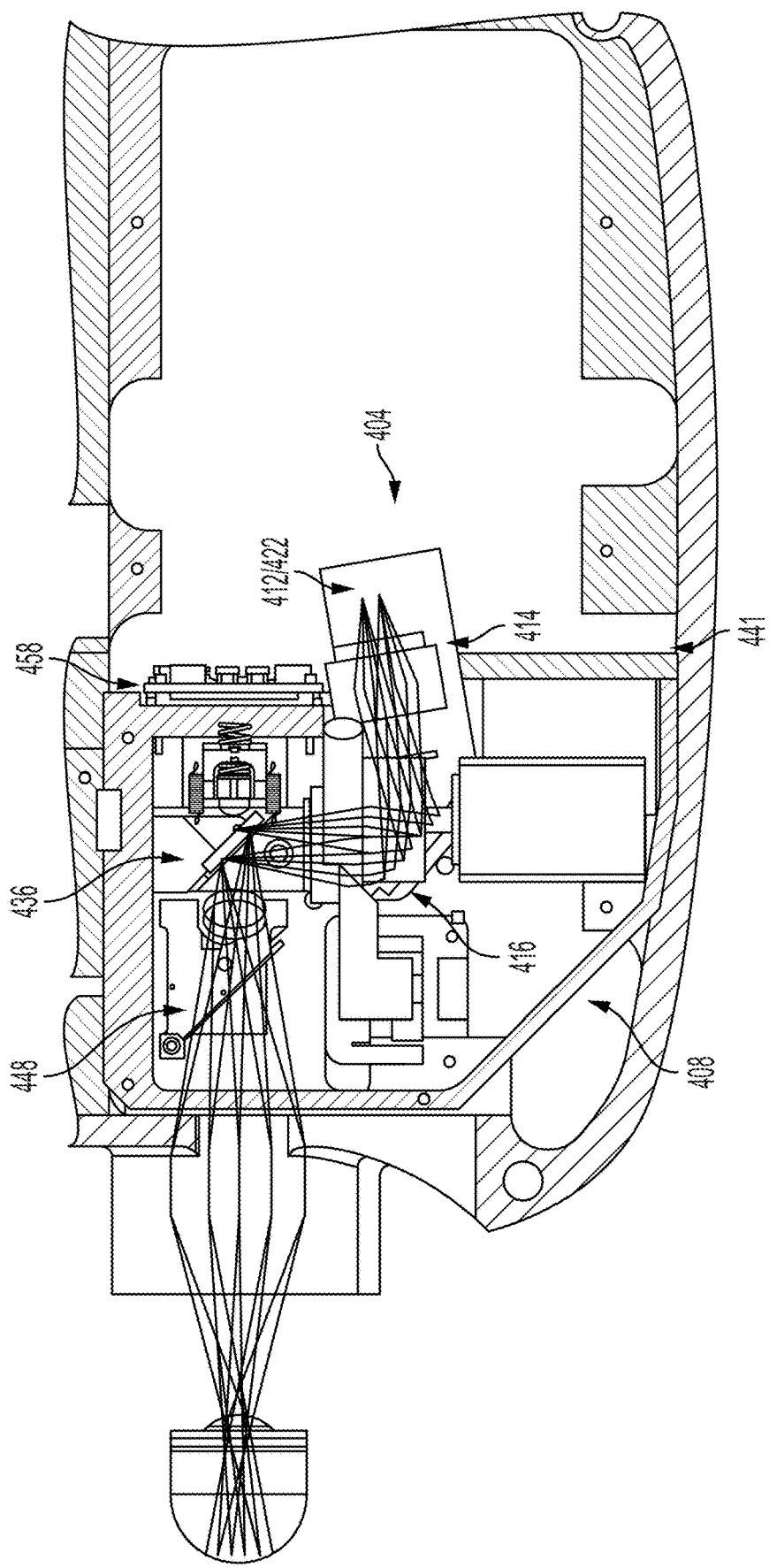
FIG. 5 is a top view of a portion of the imaging apparatus of FIG. 4 showing the white light and fluorescence imaging components of the imaging apparatus, according to some embodiments.

FIG. 5 is a top view of a portion of imaging apparatus 400 showing white light and fluorescence imaging components 404, according to some embodiments. In FIG. 5, white light and fluorescence imaging components 404 include light sources 412 and 422, collimating lens 414, mirror 416, illumination mirror 436, fixation dichroic 448, and camera 458. FIG. 5 also shows a fixation display mount 441, where a fixation display (e.g., 442 in FIG. 6A) may be positioned, in some embodiments, and housing member 408 supporting white light and fluorescence imaging components 404.

In some embodiments, light sources 412 and 422 may be white light and/or fluorescence light sources, respectively. For example, light sources 412 and 422 may be configured to generate light for illuminating and/or exciting molecules in a subject's eye via collimating lens 414. In some embodiments, mirror 416 may be configured to reflect light from light sources 412 and 422 toward illumination mirror 436. In some embodiments, fixation dichroic 448 may be configured to reflect light from the fixation display toward the subject's eye. In some embodiments, illumination mirror 436 may be configured to transmit light received from the subject's eye to camera 458. For example, in some embodiments, illumination mirror 436 may have an aperture positioned such that light received from light sources 412 and 422 reflects off portions of illumination mirror 436 and light received from the subject's eye passes through the aperture.

It should be appreciated that, in some embodiments, imaging apparatuses described herein may have fewer and/ or different combinations of imaging components than shown in FIGS. 4-5. For example, an imaging apparatus may have only white light and/or fluorescence imaging components. In another example, an imaging apparatus may have white light, fluorescence, OCT, and/or IR imaging components positioned on a same side of the imaging apparatus, as the disclosure is not so limited.

III. Eye Localization and/or Undesired Reflection Reduction Techniques

The inventors developed techniques for localizing portions of a subject's eye before, during, and/or after imaging and adjusting one or more light sources to selectively illuminate some portions of the subject's eye to produce higher quality and more medically useful images of the subject's eye, as described further herein including with reference to white light and fluorescence imaging components 404. It should be appreciated that techniques described herein for white light and fluorescence imaging components 404 may be used in connection with any or all imaging modalities described herein including white light, fluorescence, OCT, IR, and/or other modalities, and/or any combination of these modalities and/or other modalities, as embodiments described herein are not so limited.

FIG. 6A is a schematic view of white light and fluorescence imaging components 404 with fixation components 440, according to some embodiments. In FIG. 6A, white light and fluorescence imaging components 404 include source components 410 and 420, sample components, fixation components 440, and detection components 450. In some embodiments, source components 410 and 420 may be configured to generate and transmit light to a subject's eye via the sample components, and detection components 450 may be configured to receive light from the subject's eye and capture an image using the received light. In some embodiments, fixation components 440 may be configured to display a fixation object to the subject before, during, and/or after imaging.

In FIG. 6A, source components 410 and 420 include light sources 412 and 422, collimating lenses 414*a* and 414*b*, mirror 416, and focusing lenses 418*a* and 418*b*. In some embodiments, light sources 412 and 414 may be white light and fluorescence light sources, respectively. Collimating lenses 414*a* and 414*b* are shown in FIG. 6A as an achromatic lens and a plano-convex lens, respectively, which may be configured to collimate light from light sources 412 and 422. Mirror 416 is shown in FIG. 6A configured to reflect light from light sources 412 and 422 toward illumination mirror 436 of source components. Focusing lenses 418*a* and 418*b* are shown in FIG. 6A as a plano-convex lens and an achromatic lens, respectively, which may be configured to focus light from light sources 412 and 422 on at least a portion of illumination mirror 436. In FIG. 6A, focusing lenses 418*a* and 418*b* are shown focusing light on at least two portions of illumination mirror 436 without transmitting light to a center of illumination mirror 436.

In FIG. 6A, the sample components include illumination mirror 436 and objective lens 438. In some embodiments, illumination mirror 436 may be configured to reflect light from source components 410 and 420 toward the subject's eye. In some embodiments, objective lens 438 may be configured to focus light from illumination mirror 436 on the subject's eye and to focus light received from the subject's eye on illumination mirror 436. Illumination mirror 436 may be further configured to transmit light received from the subject's eye via objective lens 438 toward detection components 450.

In FIG. 6A, fixation components 440 include fixation display 442, fixation mirror 444, fixation focusing lenses 446, and fixation dichroic 448. In some embodiments, fixation display 442 may be configured to display a fixation object to the subject's eye before, during, and/or after imaging. In some embodiments, fixation mirror 444 may be configured to reflect fixation light from fixation display toward fixation dichroic 448, which may be configured to provide the fixation light to the subject's eye along an illumination path along which the subject's eye is illuminated with light from source components 410 and 420. In some embodiments, fixation focusing lenses 446 may be configured to focus the fixation light on the subject's eye. In FIG. 6A, fixation components 440 share at least part of an optical path with source components 410 and 420, as sample components 430 convey fixation light and illumination light via objective lens 438. In FIG. 6A, detection components 450 include camera 458 and lenses configured to focus light received from the subject's eye on camera 458.

Figure 6B:
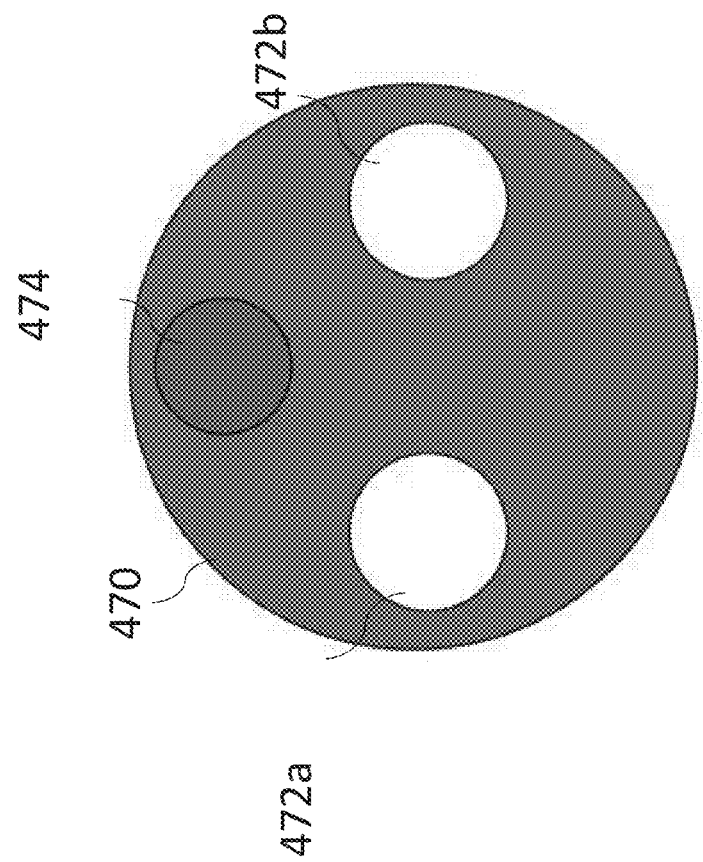
FIG. 6B is a view of an imaging target from the perspective of the white light and fluorescence imaging components of FIG. 6A, according to some embodiments.

FIG. 6B is a view of an imaging target 470 from the perspective of the white light and fluorescence imaging components 404, according to some embodiments. In some embodiments, imaging target 470 may be a subject's eye. In some embodiments, imaging target 470 may be a portion of the subject's eye, such as the pupil of the subject's eye. In FIG. 6B, imaging target 470 includes first portions 472*a* and 472*b* and second portion 474.

The inventors recognized that certain portions of a subject's eye produce undesired reflections when illuminated during imaging, and the reflections can degrade the quality of images captured when the eye is illuminated. For example, the cornea and/or iris of the subject's eye may produce very bright reflections that can be conveyed to the imaging sensor along with desired reflections from portions of interest of the subject's eye, which may be less bright than the cornea and/or iris reflections, thereby degrading images of the portions of interest.

To address these problems, the inventors developed techniques for selectively illuminating and imaging one or more portions of a subject's eye, thereby preventing some or even substantially all of the illumination light from reaching the undesired portions and causing reflections that reach the imaging sensor. In some embodiments, white light and fluorescence imaging components 404 may be configured to selectively illuminate first portion 472*a* and/or 472*b* with illumination light. For example, white light and fluorescence imaging components 404 may not illuminate second portion 474 such that substantially no illumination light reaches second portion 474. In some embodiments, light source 412 and/or 422 may be configured to provide the illumination light and lenses 414*a* and 414*b* and 418*a* and 418*b* and objective lens 438 may be configured to focus the illumination light on first portion 472*a* and/or 472*b*. In some embodiments, light source 412 and/or 422 may be configured to transmit the illumination light through plates 462 and 464 (FIGS. 6E and 6F, respectively), as described further herein. In some embodiments, illumination mirror 436 (FIG. 6G) may be configured to block at least some light reflected from second portion 474 from reaching detection components 450.

The inventors also developed techniques for localizing portions of interest and/or undesired portions of a subject's eye such that white light and fluorescence imaging components 404 may selectively illuminate portions of interest. In some embodiments, the imaging apparatus that includes white light and fluorescence imaging components may be configured to determine a location of an undesired portion of a subject's eye by illuminating the undesired portion of the subject's eye and using reflected light from the undesired portion to determine the location of the undesired portion. For example, the imaging apparatus may be configured to illuminate multiple portions of the subject's eye and determine that the undesired portion is the portion producing the brightest reflections. In some embodiments, white light and fluorescence imaging components 404 may be configured to illuminate and determine a location of an undesired portion of a subject's eye using light from an IR light source (e.g., of light sources 412 and 422) and/or fixation components 440 (e.g., for sensing using iris sensor 483 of FIG. 11). In some embodiments, fluorescence imaging components 404 may be configured to illuminate and determine a location of an undesired portion of a subject's eye using a dimmer white light than used to illuminate portions of interest.

In some embodiments, white light and fluorescence imaging components 404 may be configured to illuminate one or more portions of interest of the subject's eye with different illumination light than used to locate the undesired portion(s) (e.g., a white light source of light sources 412 and 422) to image the portion(s) of interest. For example, the portions of interest may be imaged once the undesired portion(s) have been located. In some embodiments, white light and fluorescence imaging components 404 may be configured to adjust an illumination of the subject's eye (e.g., adjust a number of illuminated light sources 412 and/or 422) to selectively illuminate portions of interest of the subject's eye. In some embodiments, the imaging apparatus may be configured to capture an image of the subject's using reflected light from the selectively illuminated portion(s) of the subject's eye.

Figure 6D:
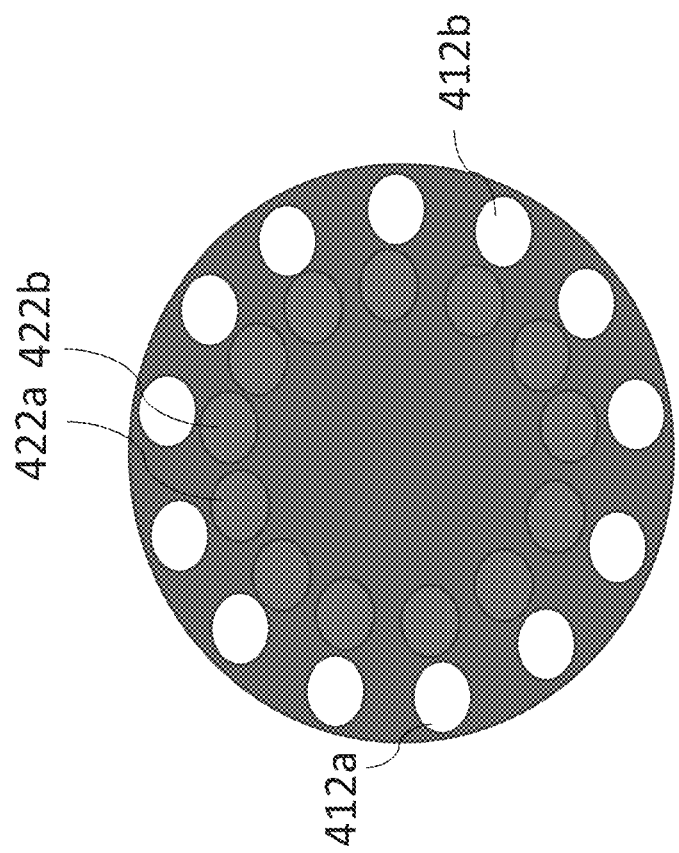
FIG. 6D is a front view of alternative light source components that may be included in the white light and fluorescence imaging components of FIG. 6A, according to some embodiments.
Figure 6C:
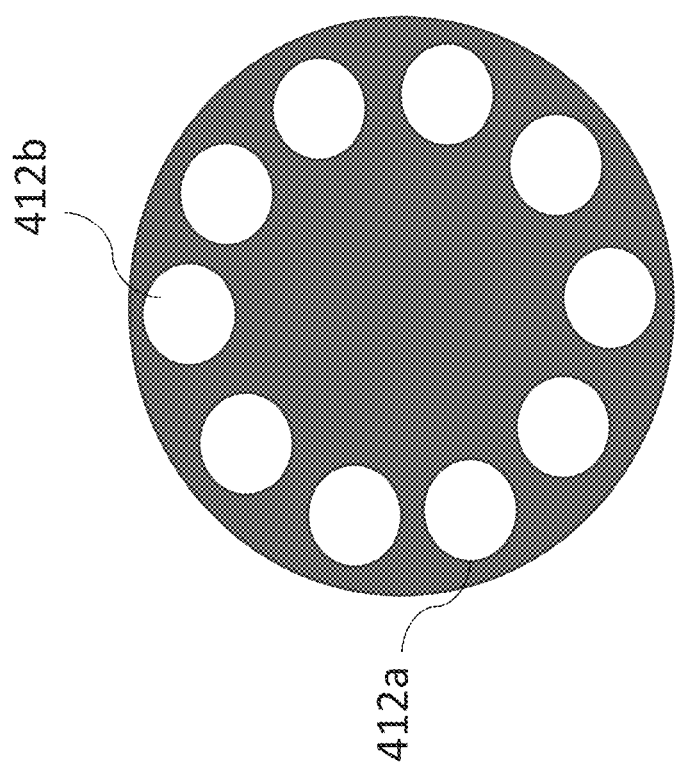
FIG. 6C is a front view of light source components that may be included in the white light and fluorescence imaging components of FIG. 6A, according to some embodiments.

FIG. 6C is a front view of light source components, including light sources 412a and 412b, that may be included in white light and fluorescence imaging components 404, according to some embodiments. In FIG. 6C, light sources 412a and 412b are among a group of light sources arranged in a ring. In some embodiments, the light sources may be white and/or IR LEDs. In some embodiments, the light sources may be independently controllable and configured to illuminate portions of the subject's eye. For example, each light source or each of multiple groups of light sources may be configured to illuminate a respective portion of the subject's eye, or ones of the light sources may be configured to overlap in illumination over various portions of the subject's eye. In some embodiments, white light and fluorescence imaging components 404 may be configured to selectively illuminate one or more of the light sources to selectively illuminate one or more portions of the subject's eye.

In some embodiments, the light sources of FIG. 6C may be configured to illuminate one or more second portions of a subject's eye such that light reflected from the second portion(s) may be used to determine the location(s) of the second portion(s). In some embodiments, the light sources of FIG. 6C may be adjustable to selectively illuminate one or more first portions of a subject's eye such that light reflected from the first portion(s) may be captured to image the first portion(s). For example, light source 412b may be configured to illuminate second portion 474 of the imaging target 470 shown in FIG. 6B such that the location of second portion 474 may be determined using light reflected from second portion 474. In this example, light source 412a may be configured to illuminate first portion 472a based on determining the location of second portion 474. In some embodiments, light source 412a may be configured to illuminate first portion 472a using brighter white light than light source 412b may use to illuminate second portion 474. For example, a brightness of the light sources may be controllable. The inventors have recognized that dimmer white light may be used to illuminate and determine a position of undesired portions of the subject's eye where the undesired portions reflect substantially more light than the desired portions, and that it is preferable, when possible, to use dimmer white light to reduce an intensity of illumination to which the subject's eye is exposed.

FIG. 6D is a front view of alternative light source components, including light sources 412a, 412b, 422a, and 422b, that may be included in white light and fluorescence imaging components 404, according to some embodiments. The light sources of FIG. 6D may be configured in the manner described for the light sources of FIG. 6C. In some embodiments, light sources 412a and 412b may be white light sources and light sources 422a and 422b may be IR light sources. For example, light source 412a and/or 412b may be configured to illuminate first portions 472a and 472b, respectively, and light sources 422a and 422b may be configured to illuminate second portion 474.

It should be appreciated that, in some embodiments, the light sources may alternatively or additionally include light sources positioned at the center of the rings illustrated in FIGS. 6C and 6D.

FIG. 6E is a front view of a plate 462 of white light and fluorescence imaging components 404, according to some embodiments. In FIG. 6E, plate 462 includes outer portion 462a and inner portion 462c with annular window 462b between outer portion 462a and obscuration 462c. In FIG. 6A, plate 462 is positioned between light sources 412 and 422 and collimating lenses 414a and 414b. In some embodiments, light sources 412 and 422 may be configured to transmit light through annular window 462b to collimating lenses 414a and 414b. In some embodiments, collimating lenses 414a and 414b, focusing lenses 418a and 418b, and/or objective lens 438 may be configured to light transmitted through annular window 462b to one or more first portions (e.g., first portion 472a and/or 472b in FIG. 6B) of a subject's eye. For example, the transmitted light may illuminate an annulus on the subject's eye. In some embodiments, the light sources may be adjustable to selectively illuminate only a portion of annular window 462b, such as by selectively illuminating a subset of the light sources shown in FIGS. 6C and 6D. In some embodiments, light source 412 and/or 422 may include a display screen, such as a liquid crystal display (LCD) screen, configured to transmit light through at least a portion of annular window 462a, such as selectively in the manner described in connection with the light sources of FIGS. 6C and 6D.

In some embodiments, as an alternative or in addition to the light sources of FIGS. 6C and 6D and/or the plate 462 of FIG. 6E, white light and fluorescence imaging components 404 may include an illumination control device, such as a digital micromirror device and/or a digital light projector configured to selectively illuminate one or more portions of the subject's eye as described herein for the light sources of FIGS. 6C and 6D and the LCD screen. For example, the illumination control device may be configured to receive illumination light from one or more light sources 412 and/or 422 and selectively direct the illumination light to one or more portions of the subject's eye.

FIG. 6F is a front view of a plate 464 with an obscuration of white light and fluorescence imaging components 404, according to some embodiments. As shown in FIG. 6F, plate 464 includes obscuration 464a. In FIG. 6A, plate 464 is positioned between collimating lenses 414a and 414b and mirror 416. In some embodiments, light from at least some of the light sources may be blocked from reaching the subject's eye by obscuration 464a. The inventors have recognized that the objective lens that focuses the transmitted light on the subject's eye may cause undesired reflections to reach the imaging sensor when certain portions of the objective lens are illuminated. To address this problem, obscuration 464a may block the illumination light from reaching at least some portions of the objective lens, thereby reducing undesired reflections reaching the imaging sensor.

FIG. 6G is a front view of illumination mirror 436 of white light and fluorescence imaging components 404, according to some embodiments. As shown in FIG. 6G, illumination mirror 436 includes aperture 436a. In some embodiments, focusing lenses 418a and 418b may be configured to focus light received from light sources 412 and 422 on portions of illumination mirror 436 other than aperture 436a such that the light is reflected toward the subject's eye. In some embodiments, objective lens 438 may be configured to focus light received from the subject's eye on aperture 436a such that the received light is transmitted to detection components 450 (e.g., to camera 458) through aperture 436a. In some embodiments, when undesired portions of the subject's eye are illuminated during selective illumination of other portions of the subject's eye, mirror 436 may block reflections from the undesired portions from reaching detection components 450. For example, substantially all of the undesired reflections may reflect off of parts of mirror 436 other than aperture 436a.

Figure 16:
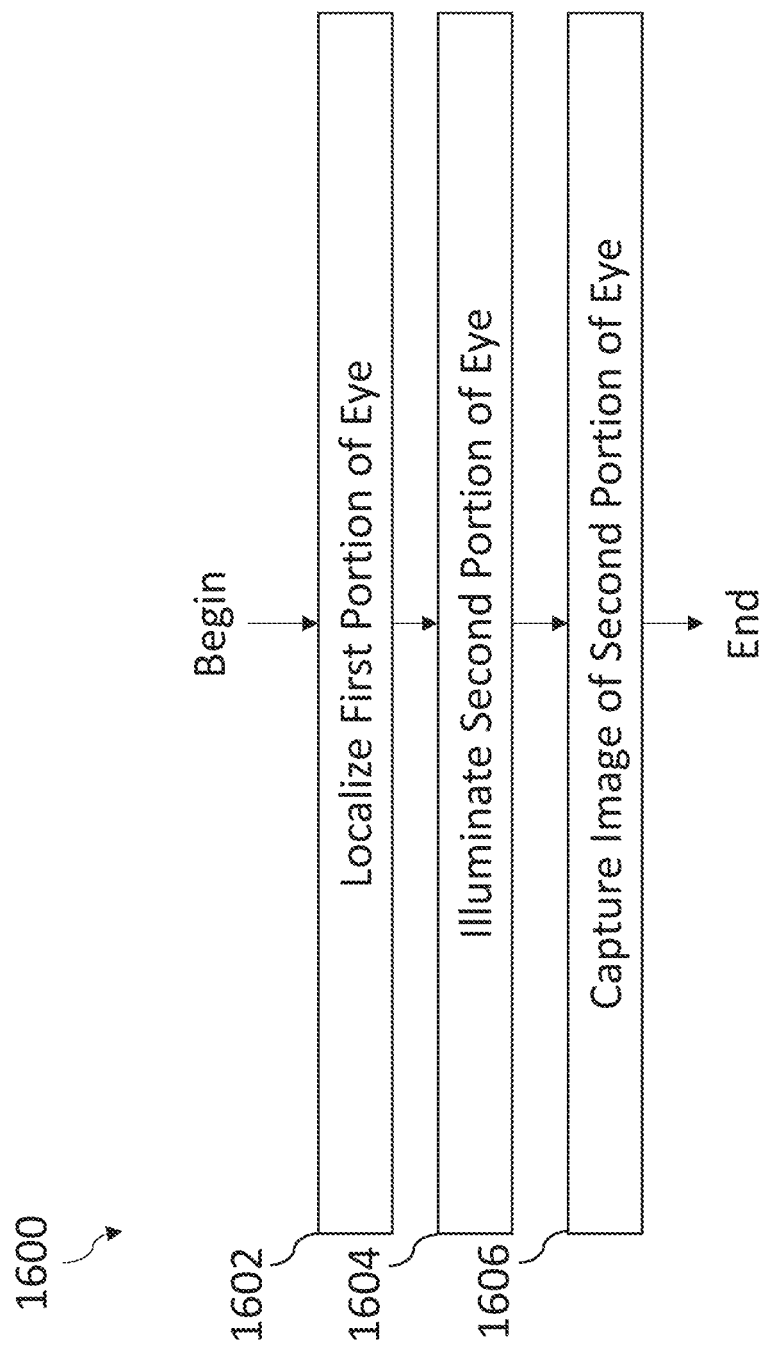
FIG. 16 is a flow diagram of an exemplary method of capturing an image of a subject's eye, according to some embodiments.

FIG. 16 is a flow diagram of an exemplary method 1600 of capturing an image of a subject's eye, according to some embodiments. In FIG. 16, method 1600 includes localizing a first portion of a subject's eye at step 1602, illuminating a second portion of the subject's eye with illumination light at step 1604, and capturing an image of the second portion of the subject's eye at step 1606. In some embodiments, method 1600 may be performed using an imaging and/or measuring apparatus described herein. For example, method 1600 may be performed in response to receiving input from a user (e.g., the subject and/or a clinician) and/or automatically.

In some embodiments, localizing the first portion of the subject's eye at step 1602 may include illuminating the first portion of the subject's eye and determining a location of the first portion using light reflected from the first portion of the subject's eye. For example, the imaging and/or measuring apparatus may illuminate multiple portions of the subject's eye before determining that one of the portions is the first portion of the subject's eye and thereby localizing the first portion of the subject's eye. In this example, the first portion may be determined from among the multiple portions by reflecting more light than at least a majority of the multiple portions. Referring to FIG. 6B, the first portion may be second portion 474. In some embodiments, illuminating the first portion of the subject's eye at step 1602 may include illuminating the first portion with IR light from an IR light source using a plurality of IR optical components, such as a subset of the IR light sources shown in FIG. 6D. In some embodiments, the first portion may be illuminated using white light, such as using a subset of the white light sources shown in FIG. 6C. In some embodiments, the first portion may be located on the pupil of the subject's eye. For example, the first portion may include the subject's cornea.

In some embodiments, illuminating the second portion of the subject's eye with illumination light at step 1604 may include illuminating the second portion with white light from a white light source. For example, the imaging and/or measuring apparatus may illuminate the second portion with illumination light in response to localizing the first portion of the subject's eye. In some embodiments, the imaging and/or measuring apparatus may selectively illuminate the second portion with illumination light from a subset of the light sources shown in FIG. 6C or 6D. In some embodiments, the second portion may be located on the pupil of the subject's eye. In some embodiments, the first portion of the subject's eye may be localized at step 1602 using white light and the second portion may be illuminated at step 1604, with the white light used to illuminate the second portion at step 1604 being brighter than the white light used to illuminate the first portion at step 1602. In some embodiments, a location of the second portion of the subject's eye may be determined with reference to the location of the first portion of the subject's eye determined at step 1602. For example, the first portion of the subject's eye may include a subset of and/or the portions of the subject's pupil that do not include the cornea.

In some embodiments, capturing the image of the second portion of the subject's eye at step 1606 may include receiving reflected illumination light from the second portion of the subject's eye and capturing an image using the reflected illumination light. For example, the reflected illumination light may be received at an imaging and/or measuring sensor. In some embodiments, a mirror having an aperture may block illumination light reflected by the second portion of the subject's eye from contributing to the image captured during step 1606.

IV. User Feedback Techniques

In some embodiments, imaging apparatuses described herein may be configured to provide feedback to a user of the imaging apparatus. As described above, imaging apparatuses described herein may be operated by a subject to image the subject's own eyes. The inventors developed techniques for providing feedback to the subject to facilitate capturing medically useful images of the subject's eyes even in the absence of a medical professional or technician. In some embodiments, an imaging apparatus may be configured to provide feedback to a user of the imaging apparatus (e.g., the subject, a clinician, a technician, and/or a doctor) indicating a location of the subject's eye in a field of view of the imaging apparatus. For example, the subject may move the subject's eye in the field of view of the imaging apparatus, in response to receiving the feedback, in order to capture images of different portions of the subject's eye. In some embodiments, the imaging apparatus may be configured to localize the subject's eye in the field of view and provide visual feedback in response to localizing the subject's eye. For example, the imaging apparatus may be configured to automatically provide the visual feedback rather than needing input from the user to prompt the visual feedback.

In some embodiments, the imaging apparatus may be configured to determine a target position of the subject's eye. For example, the imaging apparatus may be configured to localize portions of interest and/or undesired portions of the subject's eye and determine the target position as the position where the subject's eye should be positioned relative to the imaging apparatus (e.g., white light and fluorescence imaging components of the imaging apparatus) such that the portions of interest may be illuminated and light may be blocked from reaching the undesired portions. In some embodiments, the imaging apparatus may be configured to display to the user an indication of the target position of the subject's eye and/or a current position of the subject's eye. For example, the indications may be displayed to the user via fixation components 440 of white light and fluorescence components 404. In some embodiments, the imaging apparatus may be configured to capture an image of the subject's eye once the current position of the subject's eye is within a threshold range of the target position, such as after an automatic adjustment of the current position by the imaging apparatus and/or manual repositioning by the user in response to visual feedback.

In accordance with various embodiments, the target and current positions may be in any or each of a depth direction in which the imaging apparatus is configured to transmit illumination light, a lateral direction perpendicular to the depth direction, a vertical direction perpendicular to the depth and lateral directions, a roll direction oriented rotationally about the depth direction, a pitch direction oriented rotationally about the lateral direction, and a yaw direction oriented rotationally about the vertical direction.

It should be appreciated that user feedback techniques described herein in connection with white light and fluorescence imaging components 404 may be used in connection with any or all imaging modalities described herein including white light, fluorescence, OCT, IR, and/or other modalities, and/or any combination of these modalities and/or other modalities, as embodiments described herein are not so limited.

FIG. 7 is a view of fixation display 442 from the perspective of a subject being imaged using white light and fluorescence imaging components 404, according to some embodiments. In FIG. 7, fixation display 442 shows concentric first ring 482 and second ring 484. First ring 482 is shown having a larger diameter than second ring 484. In some embodiments, first ring 482 and second ring 484 may indicate respective positions of a subject's eye. For example, first ring 482 may indicate the current position of the subject's eye and second ring 484 may indicate a target position of the subject's eye. In this example, first ring 482 may collapse toward second ring 484 as the position of the subject's eye moves closer to the target position. Taking the target position to be a target distance from white light and fluorescence imaging components to the subject's eye and the current position to be a current distance from white light and fluorescence imaging components 404 to the subject's eye, for example, first ring 482 may collapse toward second ring 484 as the current distance moves closer to the target distance. In some embodiments, the user may physically move the subject's eye closer to white light and fluorescence imaging components 404 in response to visual feedback provided by fixation display 442.

In some embodiments, an imaging apparatus may be configured to display indications of a target position of the subject's eye and/or a current position of the subject's eye using light sources on fixation masks. For example, the indications of the target position and/or current position may be displayed with reference to one another, such as an indication of when the current position is within a threshold range of the target position. In some embodiments, the imaging apparatus may be configured to display to the user a first color or a second color to indicate that the current position of the subject's eye is not within a threshold range of the target position, and a third color to indicate the current position is within the threshold range. For example, the first and second colors may blend to display the third color when the current position is within the threshold range of the target position, as described further herein.

Figure 8A:
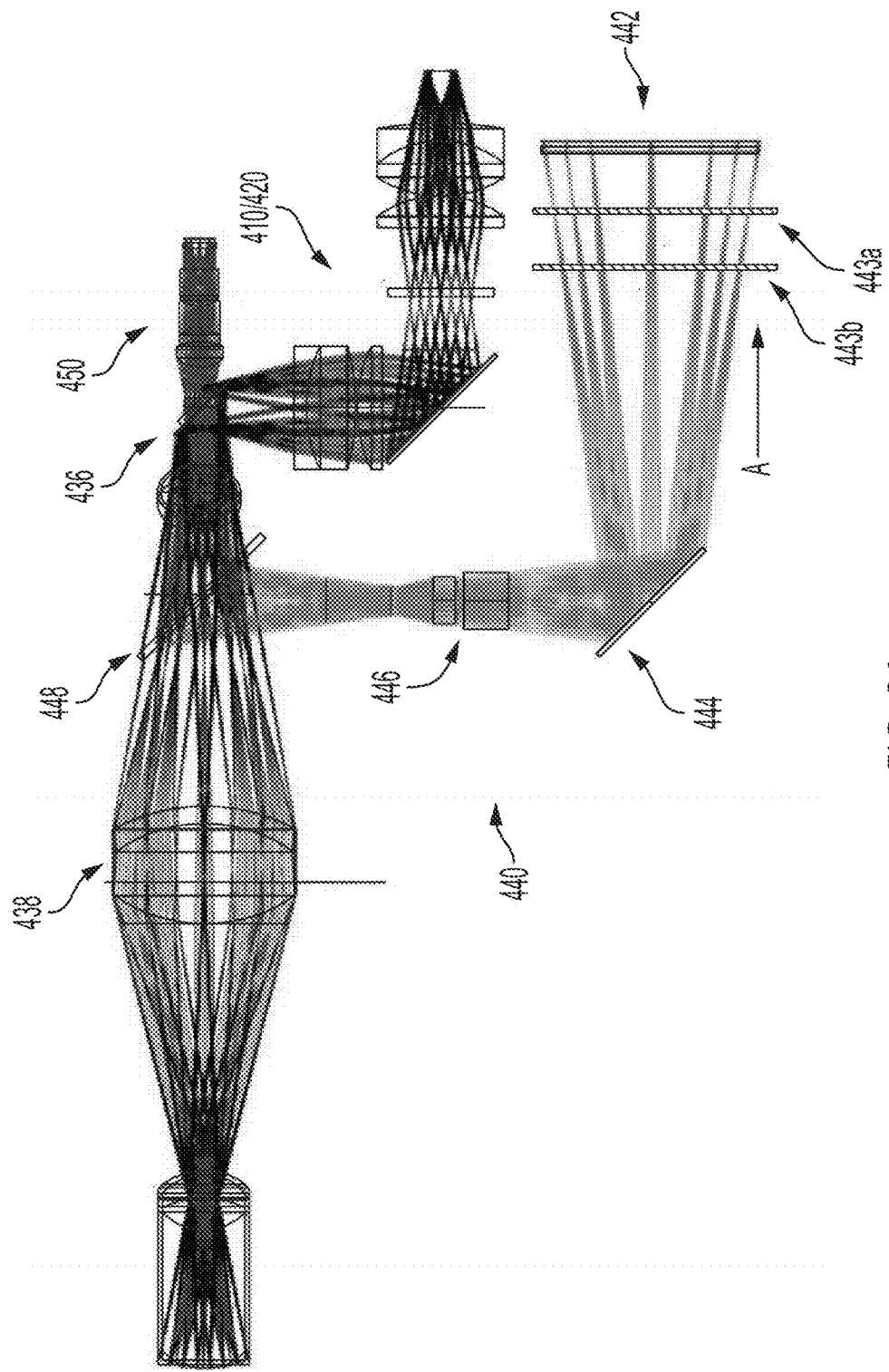
FIG. 8A is a schematic view of white light and fluorescence imaging components comprising fixation masks, according to some embodiments.
Figure 8C:
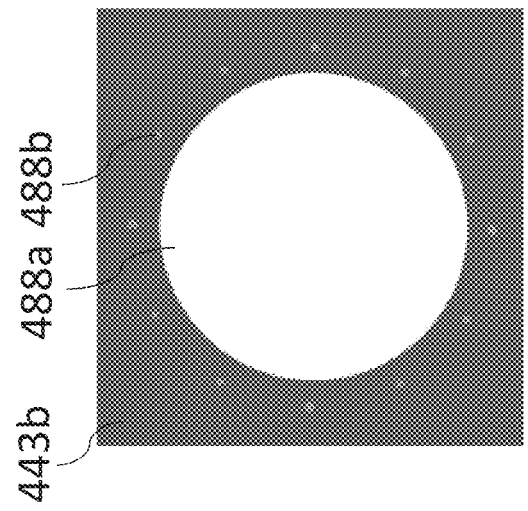
FIG. 8C is a view of a second fixation mask along direction A of the white light and fluorescence imaging components of FIG. 8A, according to some embodiments.
Figure 8B:
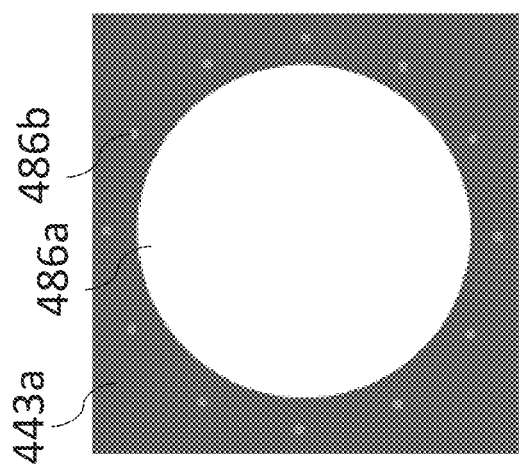
FIG. 8B is a view of a first fixation mask along direction A of the white light and fluorescence imaging components of FIG. 8A, according to some embodiments.

FIGS. 8A-8C illustrate fixation masks 443a and 443b of white light and fluorescence imaging components 404, according to some embodiments. FIG. 8A is a schematic view of white light and fluorescence imaging components 404 with fixation masks 443a and 443b positioned between fixation display 442 and fixation mirror 444, according to some embodiments. In FIG. 8A, fixation mask 443a is positioned between fixation display 440 and fixation mask 443b along an optical path from the subject's eye to fixation display 442.

FIG. 8B is a view of fixation mask 443a along direction shown in FIG. 8A, according to some embodiments. FIG. 8C is a view of fixation mask 443b along direction A shown in FIG. 8A, according to some embodiments. As shown in FIG. 8B, fixation mask 443a includes aperture 486a and light sources 488a arranged about aperture 486a. Similarly, in FIG. 8C, fixation mask 443b includes aperture 488a and light sources 488b arranged about aperture 488a. In FIGS. 8B-8C, aperture 486a has a larger diameter than aperture 488a. Similarly, light sources light sources 486b and 488b are arranged in respective rings, with the ring of light sources 486b having a larger diameter than the ring of light sources 488b. In some embodiments, light sources 486b and 488b may be configured to emit light of a different wavelength than fixation display 440. Alternatively, or additionally, in some embodiments, light sources 486b and 488b may be configured to emit light of different wavelengths from one another. For example, light sources 486b may be configured to emit blue light and light sources 488b may be configured to emit yellow light, or vice versa.

In some embodiments, fixation masks 443a and 443b may be configured to display light of a first wavelength indicating a current position of the subject's eye. For example, at a first position in a field of view of the imaging apparatus, only light from fixation mask 443b may reach the subject's eye, with substantially all of the light from fixation mask 443a being blocked by fixation mask 443b. In some embodiments, fixation masks 443a and 443b may be further configured to display light of a second color indicating a target position of the subject's eye. For example, fixation masks 443a and 443b may be positioned such that, when the subject's eye is within a threshold range of the target position, light from both fixation masks 443a and 443b reaches the subject's eye and blends to form the second color. In these examples, a user may be able to determine whether the current position of the subject's eye is within the threshold range of the target position based on whether the first or second color is displayed to the user.

Figure 9A:
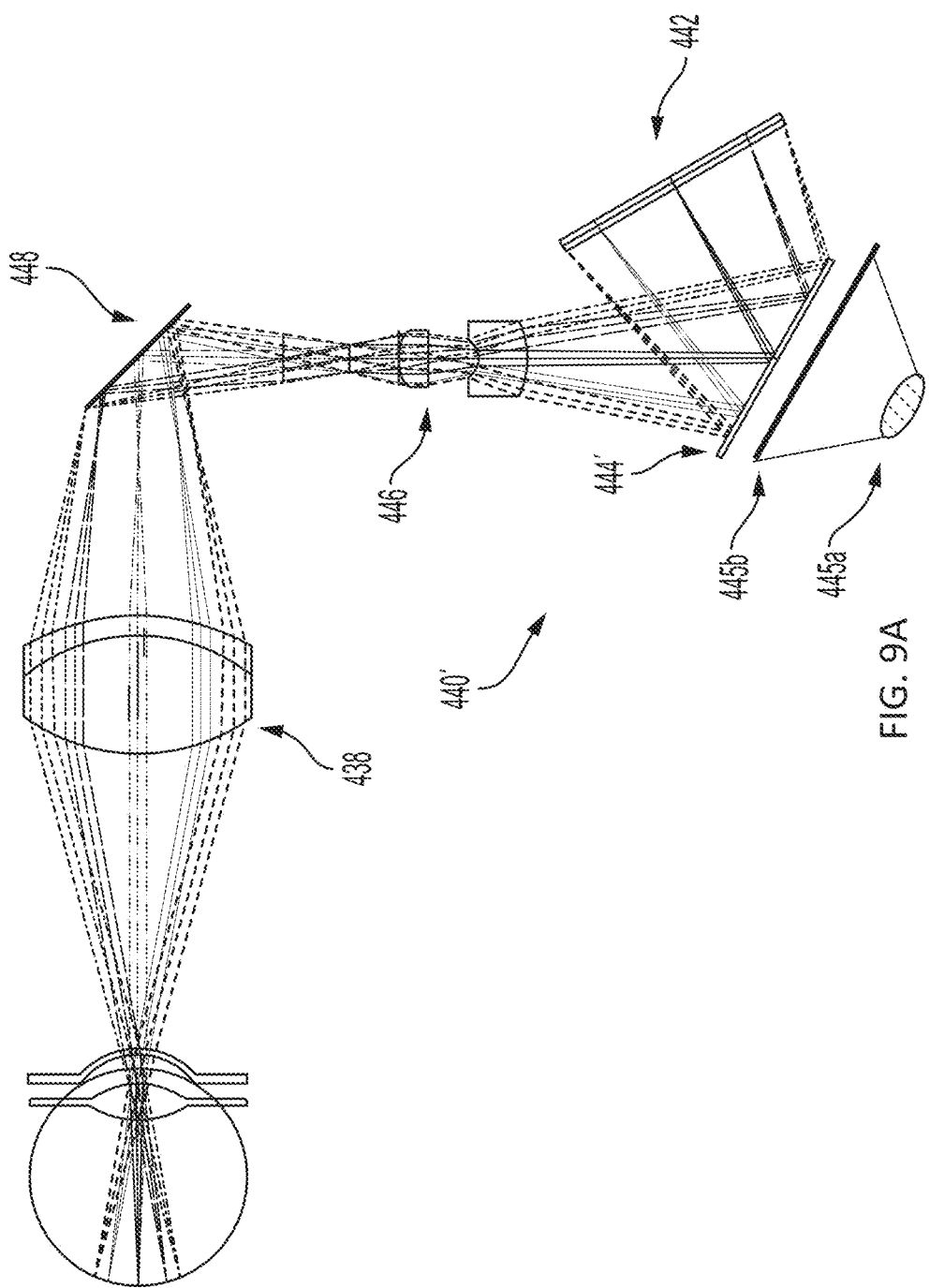
FIG. 9A is a schematic view of alternative fixation components of the white light and fluorescence components of FIG. 6A, according to some embodiments.

FIGS. 9A-9C illustrate alternative fixation components that may be included in white light and fluorescence imaging components 404, according to some embodiments. FIG. 9A is a schematic view of alternative fixation components 440' of white light and fluorescence components 404, according to some embodiments. As shown in FIG. 9A, fixation components 440' include fixation display 442, fixation mirror 444', fixation light source 445a and mask 445b, fixation focusing lenses 446, and fixation dichroic 448. In some embodiments, fixation light source 445a may be configured to display light of a different wavelength than fixation display 442. In some embodiments, fixation mirror 444' have apertures arranged such that light from fixation display 442 is reflected by fixation mirror 444' and light from fixation light source 445a are transmitted through the apertures to the subject's eye. For example, fixation mirror 444' is shown in FIG. 9A positioned between fixation display 442 and fixation light source 445a.

FIG. 9B is a front view of mask 445b, according to some embodiments. FIG. 9C is a front view of fixation mirror 444', according to some embodiments. Mask 445b is shown in FIG. 9B including apertures 492a, 492b, and 492c, with apertures 492a arranged in an outer ring, apertures 492b arranged in an inner ring, and aperture 492c at the center of mask 445b. Similarly, fixation mirror 444' is shown in FIG. 9C including apertures 494a, 494b, and 494c, with apertures 494a arranged in an outer ring, apertures 494b arranged in an inner ring, and aperture 494c at the center of mirror 444'. In some embodiments, the outer ring of apertures 492a and the center aperture 492c of mask 445b may be aligned with the outer ring of apertures 494a and the center aperture 494c of fixation mirror 444'. In some embodiments, the inner ring of apertures 492b of mask 445b may have a larger diameter than the inner ring of apertures 494b of fixation mirror 444'.

In some embodiments, fixation components 440' may be configured to display a first configuration of lights indicating a current position of the subject's eye. For example, at a first position in a field of view of the imaging apparatus, only light from fixation display 442 reflected by fixation mirror 444' and light from fixation light source 445a transmitted through center apertures 492c and 494c may reach the subject's eye, with substantially all of the light from fixation light source 445a transmitted through the inner ring of apertures 492b being blocked by fixation mirror 444'. In some embodiments, fixation components 440' may be further configured to display a second configuration of lights indicating a target position of the subject's eye. For example, mask 445b and fixation mirror 444' may be configured such that, when the subject's eye is within a threshold range of the target position, light from fixation light source 445a is transmitted through the inner ring of apertures 492b of mask 445b and the inner ring of apertures 494b of fixation mirror 444' and reaches the subject's eye. In these examples, a user may be able to determine whether the current position of the subject's eye is within the threshold range of the target position based on whether the first or second configuration of lights is displayed to the user.

Figure 10A:
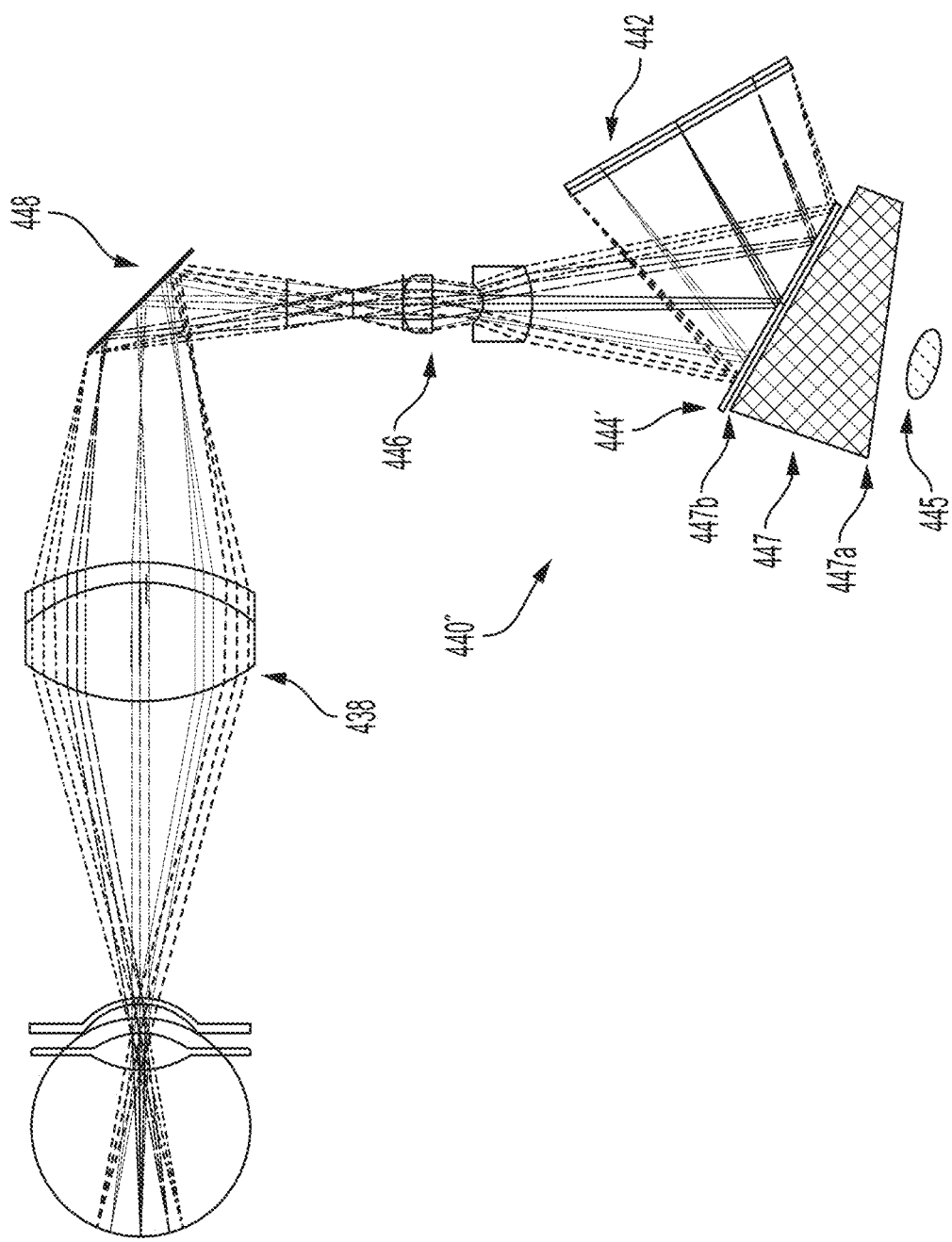
FIG. 10A is a schematic view of further alternative fixation components of the white light and fluorescence imaging components of FIG. 6A, according to some embodiments.

FIG. 10A is a schematic view of further alternative fixation components 440" of white light and fluorescence imaging components 404, according to some embodiments. In FIG. 10A, fixation components 440" include fixation display 442, fixation mirror 444', fixation light source 445, beamsplitter 447, fixation focusing lenses 446, and fixation dichroic 448. Beamsplitter 447 is shown positioned between fixation display 442 and fixation light source 445. In some embodiments, fixation light source may be configured in the manner described for fixation light source 445a in connection with FIGS. 9A-9C. In some embodiments, beamsplitter 447 may be formed using an at least partially opaque material.

Figure 10C:
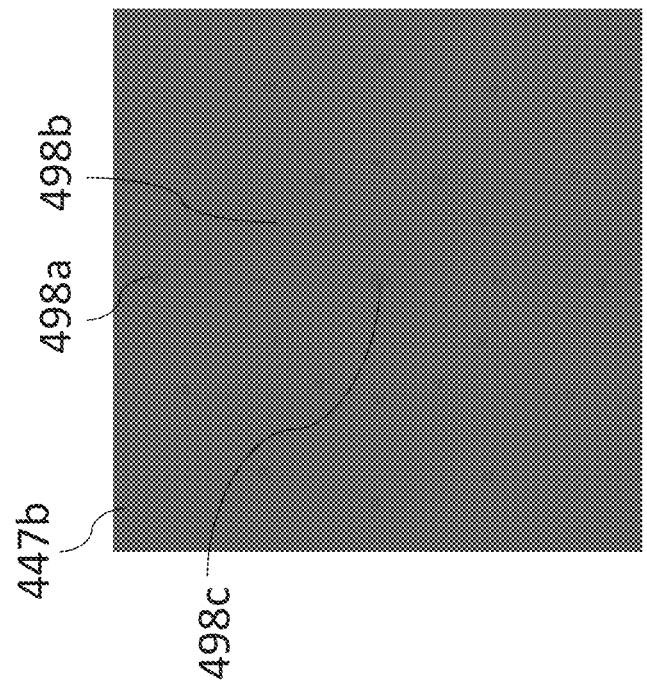
FIG. 10C is a rear view of a second end of the of FIG. 10A, according to some embodiments.
Figure 10B:
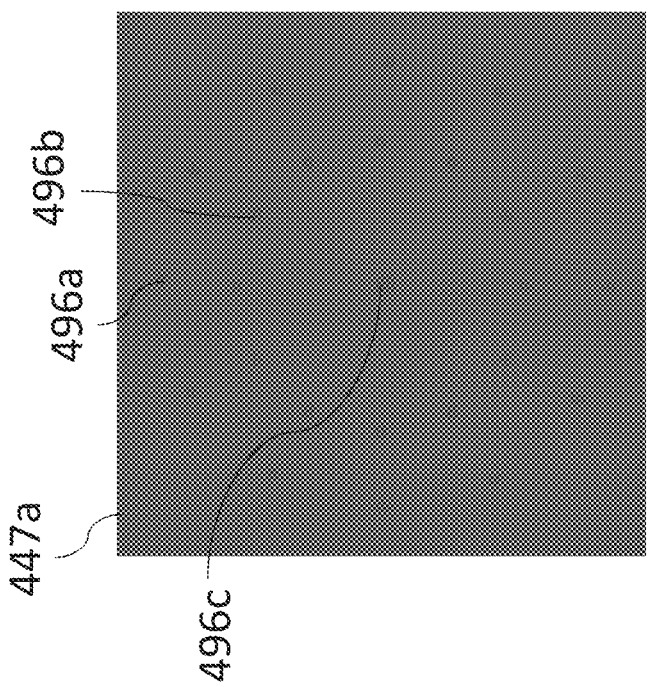
FIG. 10B is a front view of a first end of a beamsplitter of FIG. 10A, according to some embodiments.

FIG. 10B is a front view of beamsplitter 447 at first end 447a proximate fixation light source 445, according to some embodiments. FIG. 10C is a rear view of beamsplitter 447 at a second end 447b proximate fixation mirror 444', according to some embodiments. As shown in FIG. 10B, first end 447a of beamsplitter 447 has apertures 496a, 496b, and 496c, with apertures 496a arranged in an outer ring, apertures 496b arranged in an inner ring, and aperture 496c at the center of first end 447a. Similarly, second end 447b of beamsplitter 447 is shown in FIG. 10C having apertures 498a, 498b, and 498c, with apertures 498a arranged in an outer ring, apertures 498b arranged in an inner ring, and aperture 498c at the center of second end 447b. In some embodiments, channels within beamsplitter 447 may connect apertures 496a, 496b, and 496c to apertures 498a, 498b, and 498c, respectively.

In some embodiments, fixation components 440" may be configured to display a first configuration of lights indicating a current position of the subject's eye and a second configuration of lights indicating a target position of the subject's eye, similar to fixation components 440'. For example, at a first position in a field of view of the imaging apparatus, only light from fixation display 442 reflected by fixation mirror 444' and light from fixation light source 445 transmitted through center apertures 496c and 498c may reach the subject's eye, with substantially all of the light from fixation light source 445 transmitted through the inner ring of apertures 496b being blocked by fixation mirror 444'. In some embodiments, fixation components 440' may be further configured to display a second configuration of lights indicating a target position of the subject's eye. For example, beamsplitter 447 and fixation mirror 444' may be configured such that, when the subject's eye is within a threshold range of the target position, light from fixation light source 445 is transmitted through the inner ring of apertures 496b of first end 447a of beamsplitter 447, the inner ring of apertures 498b of second end 447b of beamsplitter 447, and the inner ring of apertures 494b of fixation mirror 444' to reach the subject's eye. In these examples, a user may be able to determine whether the current position of the subject's eye is within the threshold range of the target position based on whether the first or second configuration of lights is displayed to the user.

V. Iris Sensing Techniques

Figure 11:
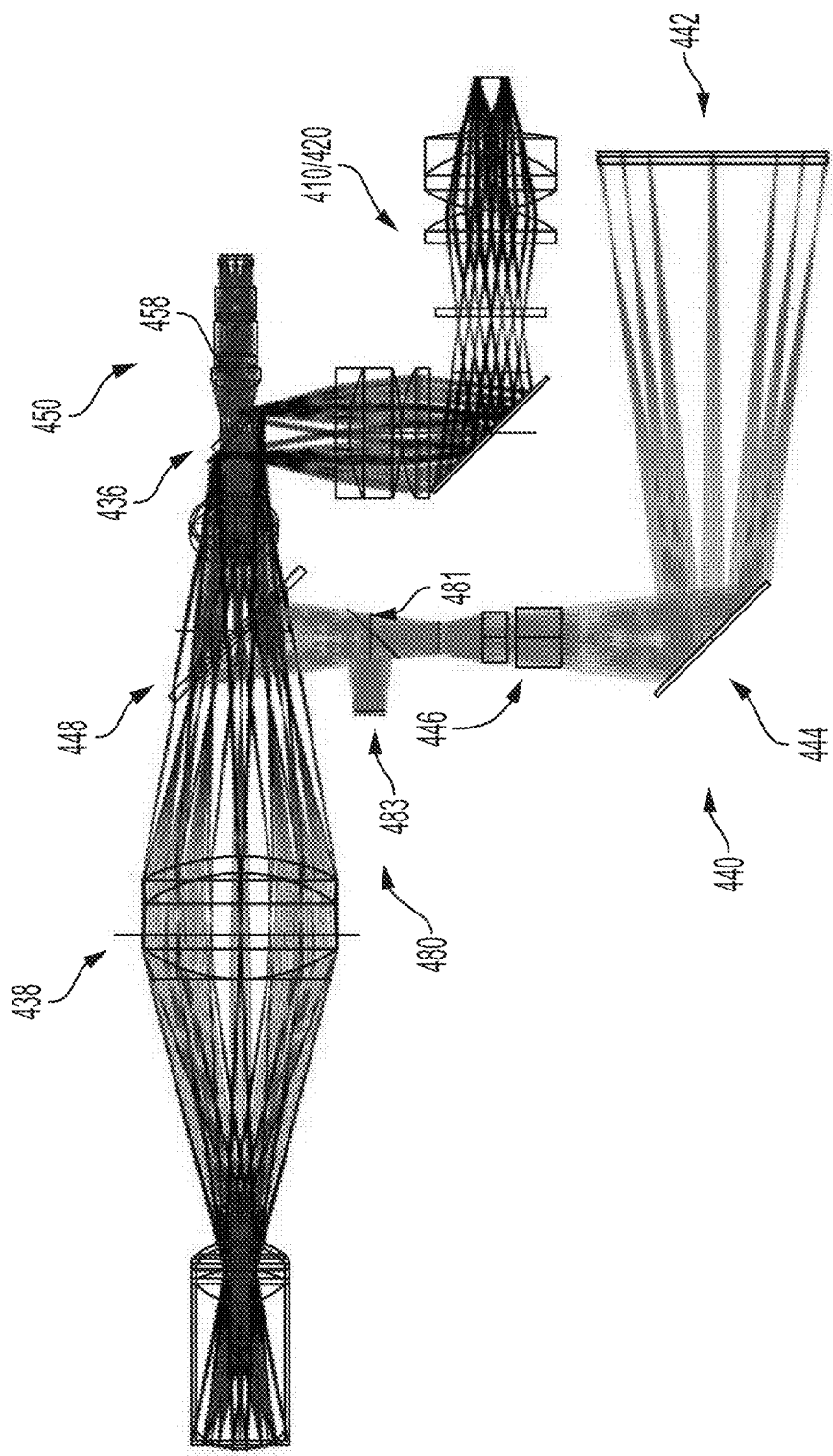
FIG. 11 is a schematic view of white light and fluorescence imaging components that further comprise iris sensor components, according to some embodiments.

FIG. 11 is a schematic view of white light and fluorescence imaging components 404 further comprising iris sensor components 480, according to some embodiments. As shown in FIG. 11, iris sensor components 480 are positioned between fixation focusing lens 446 and fixation dichroic 448 of fixation components 440. In some embodiments, iris sensor components 480 may be configured to capture images using light received from the subject's eye and reflected by fixation dichroic toward fixation components 440. For example, in FIG. 11, iris sensor components comprise iris dichroic 481 and iris sensor 483, with iris dichroic being configured to transmit light from fixation display 442 to fixation dichroic 448 and to reflect light from fixation dichroic toward 483. In some embodiments, iris dichroic 481 may be configured to transmit light at a wavelength of light transmitted by fixation display 442 and reflect light at a wavelength of light iris sensor 483 is configured to receive.

In some embodiments, white light and fluorescence imaging components 404 may be configured to image the iris of a subject's eye using iris sensor components 480. In some embodiments, as described herein, an imaging apparatus including white light and fluorescence components 404 may be configured to localize different portions of a subject's eye. For example, the imaging apparatus may be configured to localize the subject's iris and/or block at least some illumination light from reaching the subject's iris to prevent iris reflections from degrading the quality of images captured of other portions of the subject's eye. In some embodiments, fixation components 440 may be configured to illuminate the subject's iris and iris sensor components 480 may be configured to image the subject's iris. For example, light reflected from the subject's iris may be reflected by fixation dichroic 448 and iris dichroic 481 toward iris sensor 483, and other light reflected by the subject's eye may be transmitted through fixation dichroic 448 toward detection components 450. In some embodiments, images of the subject's iris may be used to identify the subject, alone or in combination with images of the subject's retina fundus. For example, images of the subject's iris may provide a second layer of security, with the first layer of security being an image of the subject's retina fundus.

Figure 17:
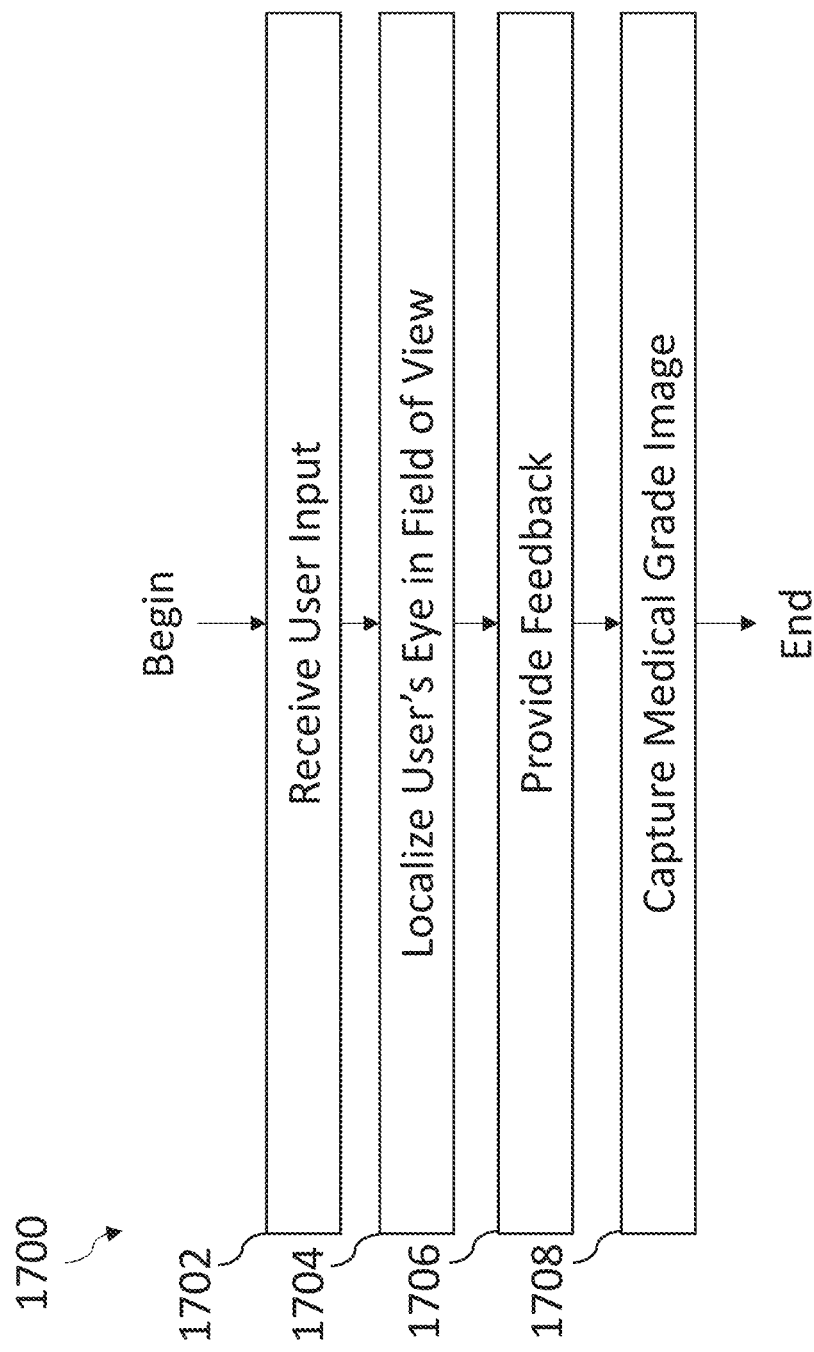
FIG. 17 is a flow diagram of an alternative exemplary method of capturing an image of a subject's eye, according to some embodiments.

FIG. 17 is a flow diagram of an alternative exemplary method 1700 of capturing an image of a subject's eye, according to some embodiments. In FIG. 17, method 1700 includes receiving user input from a user at step 1702, localizing the subject's eye in a field of view at step 1704, providing feedback to the user at step 1706, and capturing a medical grade image of the subject's eye at step 1708. In some embodiments, method 1700 may be performed using an imaging and/or measuring apparatus described herein. According to various embodiments, the user may be the subject, a clinician, technician, and/or a doctor.

In some embodiments, receiving user input from a user at step 1702 may include receiving the user input via one or more user interface devices of the imaging and/or measuring apparatus. For example, the user may press a button when ready for imaging and/or measurement. In another example, the user input may be received via audio, such as a voice signal detected using one or more microphones. In yet another example, the user input may include a gesture detected using a camera and/or a capacitive sensor. It should be appreciated that user input may be received from the user in any manner, as embodiments described herein are not so limited.

In some embodiments, localizing the subject's eye in a field of view at step 1704 may include determining a current position of the subject's eye with respect to a target position of the subject's eye, such as a current distance from one or more imaging and/or measuring devices of the imaging and/or measuring apparatus to the subject's eye with respect to a target distance. For example, the target position may be in any or each of a depth direction in which the imaging apparatus is configured to transmit illumination light, a lateral direction perpendicular to the depth direction, a vertical direction perpendicular to the depth and lateral directions, a roll direction oriented rotationally about the depth direction, a pitch direction oriented rotationally about the lateral direction, and a yaw direction oriented rotationally about the vertical direction.

In some embodiments, providing feedback to the user at step 1706 may include providing visual feedback, audio feedback, haptic feedback, and/or other modes of feedback to the user. For example, an imaging apparatus may display feedback to the user via fixation components, such as described herein. Alternatively or additionally, feedback may be provided using one or more audio devices such as a speaker, using one or more haptic feedback devices, and/or other modes. In some embodiments, the feedback provided to the user may be indicative of the location of the subject's eye determined during step 1704. For example, the feedback may indicate a difference between the current position of the subject's eye and the target position of the subject's eye. In some embodiments that include visual feedback, different colors and/or other visualizations on a fixation display may be used to indicate the difference between the current and target positions, such as described herein. In some embodiments that include audio feedback, a sequence of sounds such as beeps may indicate the difference between the current and target positions, such as decreasing the delay between sounds as the current position nears the target position, and with a solid tone indicating that the current position is within a threshold range of the target position. In some embodiments that include haptic feedback, a sequence of vibrations may indicate the difference between the current and target positions in the manner described for audio feedback, and/or by increasing the intensity of the vibrations as the current position nears the target position. It should be appreciated that other feedback techniques may be employed as embodiments described herein are not so limited.

In some embodiments, capturing a medical grade image of the subject's eye at step 1708 may include illuminating the subject's eye, such as a portion of the subject's eye located at step 1704 and/or a portion of the subject's eye located subsequent to step 1704. For example, the portion of the subject's eye located at step 1704 may be a desired portion to be illuminated during imaging or may be an undesired portion not to be illuminated during imaging. In some embodiments, the user may move the imaging apparatus relative to the subject's eye in response to feedback received at step 1706 until the subject's eye reaches a target position at which a portion of the subject's eye desired to be illuminated during imaging is in position to be illuminated during imaging. In some embodiments, the medical grade image(s) captured at step 1708 may be used to determine a health condition and/or health status of the user.

VI. Stabilization Techniques

The inventors have developed techniques to compensate for misalignment between scans of a subject's eye captured using OCT, as described herein. In some embodiments, OCT imaging components described herein may be configured to capture first and second scans of a subject's eye by scanning respective first and second portions of the subject's eye. For example, a scanning mirror of the OCT imaging components may be configured to mechanically rotate between the first and second scans to image the respective first and second portions, which may be separated along a line. For instance, each of the first and second scans may be depth scans in a depth direction, where the OCT imaging components transmit and receive reflected light along the depth direction, and the first and second scans may be displaced from one another in a lateral and/or horizontal direction perpendicular to the depth direction. Alternatively, each of the first and second scans may be lateral or vertical scans, each including multiple depth scans (e.g., displaced from one another in the lateral or vertical directions), and the first and second scans may be displaced from one another in the vertical or lateral direction, respectively.

The inventors have recognized that OCT scanning may involve some movement of the subject and/or the imaging apparatus between capturing scans. For example, the subject may move relative to the imaging apparatus between capturing scans, such as when the imaging apparatus is held in place by a mount. Alternatively or additionally, the imaging apparatus may move relative to the subject, such as when the subject holds the imaging apparatus in the subject's hands. In either case, scans may become misaligned during even a single scan sequence, such as a series of scans having no discernible time delay from the perspective of the subject being imaged.

FIG. 12A shows an exemplary progression 1200*a* of scans relative to a subject's eye, according to some embodiments. FIG. 12B shows an image 1200*b* constructed using the scans captured in the progression of FIG. 12A, according to some embodiments. In the example of FIGS. 12A and 12B, each scan of the progression 1200a is a lateral scan that may include multiple depth scans, where the depth scans are in a depth direction in which the imaging apparatus may transmit and receive light is to and from the subject's eye. The depth scans of each lateral scan may be displaced from one another in a lateral direction perpendicular to the depth direction. The lateral scans shown in the progression 1200a are displaced from one another in a vertical direction perpendicular to the lateral direction. For example, in FIG. 12B, the lateral scans in the progression 1200a provide respective slices of the image, with the slices each extending in the lateral direction and being displaced from one another in the vertical direction, with the depth scan data of each slice indicated by the brightness within the slice.

As shown in FIG. 12A, the lateral scans of the progression 1200a are misaligned with one another. For example, the lateral scans may be misaligned with respect to the lateral and/or depth directions. When misaligned in the lateral direction, endpoints of a first lateral scan may be offset from endpoints of a second lateral scan in the lateral direction. Similarly, when misaligned in the depth direction, endpoints of one or more depth scans of the first lateral scan may be offset from endpoints of one or more depth scans of the second lateral scan in the depth direction. In some embodiments, scans may be misaligned as a result of movement of the subject, the imaging apparatus, or both the subject and the imaging apparatus between capturing the scans.

In some embodiments, OCT imaging components of the imaging apparatus may be configured to compensate for misalignment between scans in a depth direction by adjusting a path length of reference components of the OCT imaging components. For example, OCT images may be captured based on a difference between reference light transmitted to and reflected by a reference surface of the reference components and sample light transmitted to and reflected by the subject's eye, such as a difference in travel time, path length, and/or phase. In some embodiments, by adjusting the path length of the reference components based on movement of the subject's eye, the imaging apparatus, or both in between scans, the difference between the reflected sample light and reference light may not include a difference in path length along the depth direction toward the subject's eye between the scans.

Alternatively or additionally, in some embodiments, OCT imaging components of the imaging apparatus may be configured to compensate for misalignment in directions perpendicular to the depth direction, such as the lateral and vertical directions. For example, a scanning motor that controls a scanning mirror of the OCT components may be adjusted to compensate for misalignment in such directions.

FIG. 13A shows an exemplary progression 1300a of scans relative to a subject's eye in which compensation has been provided for misalignment between ones of the scans, according to some embodiments. FIG. 13B shows an image 1300b constructed using the scans captured in the progression of FIG. 13A, according to some embodiments. In the example of FIG. 13A, the scans are aligned in the depth and lateral directions.

Figure 14:
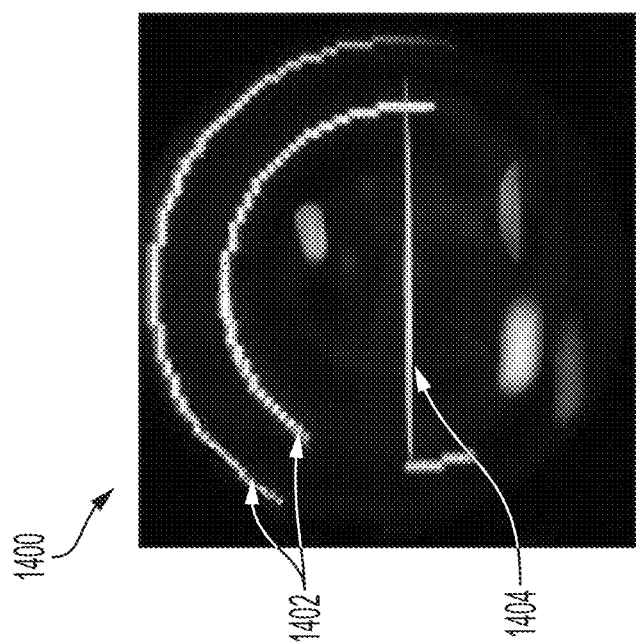
FIG. 14 is a view of an exemplary visual feedback display provided to a subject, according to some embodiments.

In some embodiments, an imaging apparatus may be configured to provide visual feedback to the subject indicating misalignment between scans such that the subject can adjust the relative positioning of the subject's eye and the imaging apparatus. FIG. 14 is a view of an exemplary visual feedback display 1400 provided to a subject, according to some embodiments. In FIG. 14, visual feedback display 1400 includes fixation rings 1402 and OCT scan line 1404. In some embodiments, fixation rings 1402 may be configured to indicate to the subject the current and/or target position(s) of the subject's eye, as described herein. In some embodiments, OCT scan line 1404 may be configured to indicate a scan line along the lateral direction and along which OCT imaging components of the imaging apparatus are configured to capture depth scans. For example, depth scans along the OCT scan line may be captured simultaneously. In some embodiments, OCT scan line 1404 may be configured to indicate alignment or misalignment between scans (e.g., lateral scans) such that the subject can reposition the subject's eye and/or the imaging apparatus after a sequence of scans (e.g., a sequence of lateral scans along a vertical direction) is complete to capture a second sequence of scans with better alignment. In some embodiments, OCT scan line 1404 may be configured to guide the subject's eye during a sequence of scans rather than or in addition to mechanical scanning by a scanning mirror of the OCT components. For example, OCT scan line 1404 may be adjusted based on detected misalignment between scans to guide the subject's eye in a manner that compensates for the detected misalignment.

Alternatively or additionally, in some embodiments, the imaging apparatus may include digital processing circuitry configured to compensate for alignment between scans images in the depth, lateral, and/or vertical directions, as described further herein. For example, the digital processing circuitry may be configured to resample scans captured using OCT components of the imaging apparatus to provide control signals that generate feedback for the subject and/or automatically adjust the OCT components to compensate for the misalignment.

Figure 15:
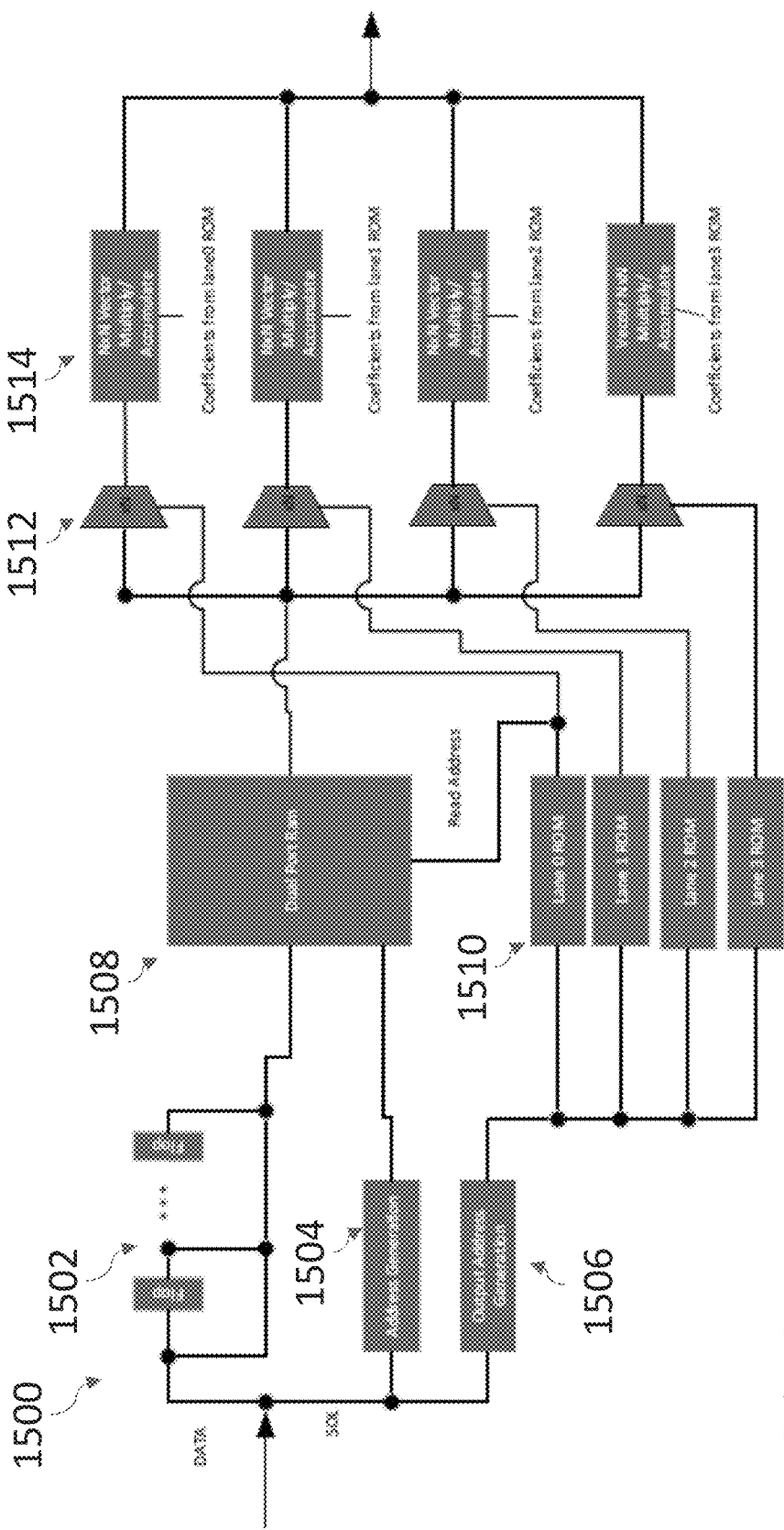
FIG. 15 is a block diagram of exemplary digital processing circuitry that may be configured to compensate for misalignment between scans, according to some embodiments.

FIG. 15 is a block diagram of exemplary digital processing circuitry 1500 that may be configured to compensate for misalignment between scans, according to some embodiments. In FIG. 15, digital processing circuitry 1500 includes input flip flops 1502, address generation logic 1504, output address generation logic 1506, image random access memory (RAM) 1508, address read-only memory (ROM) 1510, multiplexers 1512, and vector multipliers 1514. In some embodiments, digital processing circuitry 1500 may be configured to receive scan data from OCT imaging components of an imaging apparatus and provide interpolated scan data to downstream processing circuitry. In some embodiments, digital processing circuitry 1500 alone or in combination with the downstream circuitry may be configured to control the OCT imaging components to compensate for misalignment between subsequently captured images. Alternatively or additionally, digital processing circuitry 1500 alone or in combination with the downstream circuitry may be configured to compensate for misalignment between images generated using the scan data.

In some embodiments, digital processing circuitry 1500 may be formed by programming one or more digital logic units such as field programmable gate arrays (FPGAs) and/or application specific integrated circuits (ASICs). In some embodiments, one or more processors (e.g., of a computer) may be configured to execute instructions (e.g., stored in memory) that cause the processor(s) to perform functions described herein for digital processing circuitry 1500. In some embodiments, digital processing circuitry 1500 may be included in image processing circuitry of the imaging apparatus. Alternatively, digital processing circuitry 1500 may be located on a separate device such electrically coupled to imaging apparatus and/or electrically coupled to a remote device configured to receive the scan data via a communication network.

In some embodiments, digital processing circuitry 1500 may be configured to perform non-linear interpolation on received scan data. For example, the interpolation may be based on polynomial resampling for parameterized resampling with end-points tied. It should be appreciated that any form of interpolation may be used, including prolate-spheroidal windowed sinc having any number of taps (e.g., 22 taps) and any number of phasings (e.g., 2048 phasings).

In some embodiments, input flip flops 1502, address generation logic 1504, and output address generation logic 1506 may be configured to receive scan data input to digital processing circuitry 1500. For example, a number of pixels (e.g., four pixels) may be input to digital processing circuitry 1500 each clock cycle. In some embodiments, input flip flops 1502 may be configured to provide scan data to image RAM 1508. In some embodiments, address generation logic 1504 may be configured to provide address data corresponding to the scan data to image RAM 1508. In some embodiments, output address generation logic 1506 may be configured to provide output address data to address ROM 1510. In some embodiments, output address generation logic 1506 may be configured to delay generating the output address data until after the corresponding scan data has been written to image RAM 1508 to prevent reading the scan data from being read from RAM 1508 before being written.

In some embodiments, image RAM 1508 may be configured to store scan data for a number of pixels (e.g., four pixels) at each addressed location of image RAM 1508. In some embodiments, addresses of scan data stored in RAM 1508 may be shifted each clock cycle (e.g., at a beginning, middle, or end of the clock cycle). For example, the oldest scan data may be shifted out of image RAM 1508 each clock cycle and new scan data may be shifted into image RAM 1508 each clock cycle.

In some embodiments, address ROM 1510 may be configured to provide a read address for reading scan data from image RAM 1508 and control multiplexers 1512 to provide the scan data to multipliers 1514. In some embodiments, address ROM 1510 may alternatively or additionally include RAM, such that address ROM (or RAM) 1510 may be reconfigurable at run-time. In some embodiments, each unit of address ROM 1510 may be configured to select a number of samples from a corresponding window of pixels from image RAM 1508. For example, the window of pixels may be wide enough to allow for worst case amounts of skew in indices across the units of address ROM 1510. For instance, the window size may be the number of selected samples plus eight.

In some embodiments, multipliers 1514 may be configured to perform vector multiplication of scan data provided via multiplexers 1512 to compensate for misalignment between scan input to digital processing circuitry 1500. In some embodiments, coefficients of multipliers 1514 may be provided from respective units of address ROM 1510. In some embodiments, resampled data output from multipliers 1514 may be provided to fast Fourier transform (FFT) circuitry for additional processing.

In some embodiments, digital processing circuitry 1500 may be configured to, alternatively or additionally, provide diopter adjustment for defocus in the subject's eye.

It should be appreciated that scan misalignment compensation techniques described herein for OCT imaging may be used in connection with any or all imaging modalities described herein including white light, fluorescence, OCT, IR, and/or other modalities, and/or any combination of these modalities and/or other modalities, as embodiments described herein are not so limited.

Figure 18:
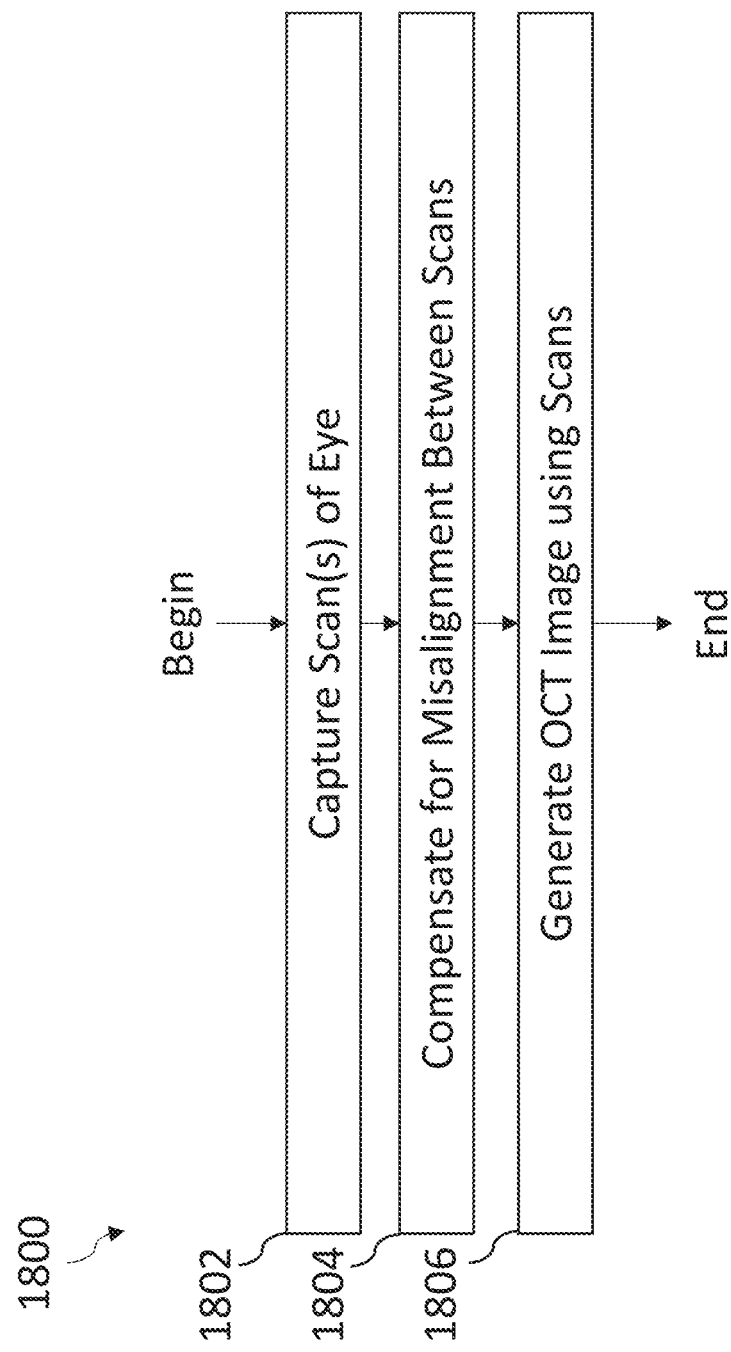
FIG. 18 is a flow diagram of an exemplary method of capturing an OCT image and/or measurement of a subject's eye, according to some embodiments.

FIG. 18 is a flow diagram of an exemplary method 1800 of capturing an OCT image and/or measurement of a subject's eye, according to some embodiments. As shown in FIG. 18, method 1800 includes capturing one or more scans of the subject's eye at step 1802, compensating for misalignment between scans at step 1804, and generating an OCT image using the scan(s) at step 1806. In some embodiments, method 1800 may be performed using an imaging and/or measuring apparatus described herein, such as including OCT imaging and/or measuring components.

In some embodiments, capturing the scan(s) of the subject's eye at step 1802 may include capturing one or more depth, lateral, and/or vertical scans of the subject's eye using OCT imaging and/or measurement components. For example, one or more depth scans may be captured in a direction along which the imaging and/or measuring apparatus is configured to transmit light. In some embodiments, multiple depth scans displaced from one another in a lateral direction or vertical direction may be captured at step 1802. For example, a lateral scan including multiple depth scans displaced from one another in a lateral direction may be captured simultaneously at step 1802.

In some embodiments, compensation for misalignment between scans at step 1804 may be between two or more scans captured at step 1802. For example, compensation may be implemented using digital feedback circuitry, such as including an interpolator, that resamples captured scans to compensate for misalignment. Alternatively or additionally, compensation for misalignment between scans at step 1804 may be between one or more scans captured at step 1802 and one or more scans to be captured at and/or following step 1804. For example, compensation may include adjusting a reference path length of reference components of the OCT imaging and/or measuring components, such as by adjusting a positioning of a reference mirror along the reference path. In another example, compensation may include adjusting a scanning mirror of sample components of the OCT imaging and/or measuring components, such as adjusting a scan angle of the scanning mirror.

According to various embodiments, compensation for misalignment between scans at step 1804 may be in any or each of the depth, lateral, and vertical directions, as well as in any of each of a roll direction oriented rotationally about the depth direction, a pitch direction oriented rotationally about the lateral direction, and a yaw direction oriented rotationally about the vertical direction.

In some embodiments, generating an OCT image using the scan(s) captured at step 1806 may include creating an OCT image following compensation for misalignment between the scan(s). For example, an OCT image may be formed using two or more depth scans having been compensated for misalignment in the depth direction, two or more lateral scans, each including one or more depth scans, having been compensated for misalignment in the lateral and/or depth directions, and/or two or more vertical scans, each including one or more depth and/or lateral scans, having been compensated for misalignment in the vertical and/or depth directions. In some embodiments, multiple OCT images may be formed using the scan(s) captured at step 1806.

VII. Applications

The inventors have developed improved imaging techniques that may be implemented using imaging apparatuses described herein. According to various embodiments, such imaging techniques may be used for biometric identification, health status determination, and disease diagnosis, and others.

The inventors have recognized that various health conditions may be indicated by the appearance of a person's retina fundus in one or more images captured according to techniques described herein. For example, diabetic retinopathy may be indicated by tiny bulges or micro-aneurysms protruding from the vessel walls of the smaller blood vessels, sometimes leaking fluid and blood into the retina. In addition, larger retinal vessels can begin to dilate and become irregular in diameter. Nerve fibers in the retina may begin to swell. Sometimes, the central part of the retina (macula) begins to swell, such as macular edema. Damaged blood vessels may close off, causing the growth of new, abnormal blood vessels in the retina. Glaucomatous optic neuropathy, or Glaucoma, may be indicated by thinning of the parapapillary retinal nerve fiber layer (RNFL) and optic disc cupping as a result of axonal and secondary retinal ganglion cell loss. The inventors have recognized that RNFL defects, for example indicated by OCT, are one of the earliest signs of glaucoma. In addition, age-related macular degeneration (AMD) may be indicated by the macula peeling and/or lifting, disturbances of macular pigmentation such as yellowish material under the pigment epithelial layer in the central retinal zone, and/or drusen such as macular drusen, peripheral drusen, and/or granular pattern drusen. AMD may also be indicated by geographic atrophy, such as a sharply delineated round area of hyperpigmentation, nummular atrophy, and/or subretinal fluid.

Stargardt's disease may be indicated by death of photoreceptor cells in the central portion of the retina. Macular edema may be indicated by a trench in an area surrounding the fovea. A macular hole may be indicated by a hole in the macula. Eye floaters may be indicated by non-focused optical path obscuring. Retinal detachment may be indicated by severe optic disc disruption, and/or separation from the underlying pigment epithelium. Retinal degeneration may be indicated by the deterioration of the retina. Central serous retinopathy (CSR) may be indicated by an elevation of sensory retina in the macula, and/or localized detachment from the pigment epithelium. Choroidal melanoma may be indicated by a malignant tumor derived from pigment cells initiated in the choroid. Cataracts may be indicated by opaque lens, and may also cause blurring fluorescence lifetimes and/or 2D retina fundus images. Macular telangiectasia may be indicated by a ring of fluorescence lifetimes increasing dramatically for the macula, and by smaller blood vessels degrading in and around the fovea. Alzheimer's disease and Parkinson's disease may be indicated by thinning of the RNFL. It should be appreciated that diabetic retinopathy, glaucoma, and other such conditions may lead to blindness or severe visual impairment if not properly screened and treated.

In another example, optic neuropathy, optic atrophy and/or choroidal folding can be indicated in images captured using techniques described herein. Optic neuropathy and/or optic atrophy may be caused by damage within the eye, such as glaucoma, optic neuritis, and/or papilledema, damage along the path of the optic nerve to the brain, such as a tumor, neurodegenerative disorder, and/or trauma, and/or congenital conditions such as Leber's hereditary optic atrophy (LHOA) autosomal dominant optic atrophy (ADOA). For example, compressive optic atrophy may be indicated by and/or associated with such extrinsic signs as pituitary adenoma, intracranial meningioma, aneurysms, craniopharyngioma, mucoceles, papilloma, and/or metastasis, and/or such extrinsic signs as optic nerve glioma, optic nerve sheath (ONS) meningioma, and/or lymphoma. Vascular and/or ischemic optic atrophy may be indicated by and/or associated with sector disc pallor, non-arteritic anterior ischemic optic neuropathy (NAION), arteritic ischemic optic neuropathy (AION), severe optic atrophy with gliosis, giant cell arteritis, central retinal artery occlusion (CRAO), carotid artery occlusion, and/or diabetes. Neoplastic optic atrophy may be indicated by and/or associated with lymphoma, leukemia, tumor, and/or glioma Inflammatory optic atrophy may be indicated by sarcoid, systemic lupus erythematosus (SLE), Behcet's disease, demyelination, such as multiple-sclerosis (MS) and/or neuromyelitis optica spectrum disorder (NMOSD) also known as Devic disease, allergic angiitis (AN), and/or Churg-Strauss syndrome. Infectious optic atrophy may be indicated by the presence of a viral, bacterial, and/or fungal infection. Radiation optic neuropathy may also be indicated.

Moreover, in some embodiments, an imaging apparatus may be configured to detect a concussion at least in part by tracking the movement of a person's eye(s) over a sequence of images. For example, iris sensors, white light imaging components, and/or other imaging components described herein may be configured to track the movement of the person's eyes for various indications of a concussion. Toxic optic atrophy and/or nutritional optic atrophy may be indicated in association with ethambutol, amiodarone, methanol, vitamin B12 deficiency, and/or thyroid ophthalmopathy. Metabolic optic atrophy may be indicated by and/or associated with diabetes. Genetic optic atrophy may be indicated by and/or associated with ADOA and/or LHOA. Traumatic optic neuropathy may be indicated by and/or associated with trauma to the optic nerve, ONS hematoma, and/or a fracture.

Accordingly, in some embodiments, a person's predisposition to various medical conditions may be determined based on one or more images of the person's retina fundus captured according to techniques described herein. For example, if one or more of the above described signs of a particular medical condition (e.g., macula peeling and/or lifting for AMD) is detected in the captured image(s), the person may be predisposed to that medical condition.

The inventors have also recognized that some health conditions may be detected using fluorescence imaging techniques described herein. For example, macular holes may be detected using an excitation light wavelength between 340-500 nm to excite retinal pigment epithelium (RPE) and/or macular pigment in the subject's eye having a fluorescence emission wavelength of 540 nm and/or between 430-460 nm. Fluorescence from RPE may be primarily due to lipofuscin from RPE lysomes. Retinal artery occlusion may be detected using an excitation light wavelength of 445 nm to excite Flavin adenine dinucleotides (FAD), RPE, and/or nicotinamide adenine dinucleotide (NADH) in the subject's eye having a fluorescence emission wavelength between 520-570 nm. AMD in the drusen may be detected using an excitation light wavelength between 340-500 nm to excite RPE in the subject's eye having a fluorescence emission wavelength of 540 nm and/or between 430-460 nm. AMD including geographic atrophy may be detected using an excitation light wavelength of 445 nm to excite RPE and elastin in the subject's eye having a fluorescence emission wavelength between 520-570 nm. AMD of the neovascular variety may be detected by exciting the subject's choroid and/or inner retina layers. Diabetic retinopathy may be detected using an excitation light wavelength of 448 nm to excite FAD in the subject's eye having a fluorescence emission wavelength between 590-560 nm. Central serous chorio-retinopathy (CSCR) may be detected using an excitation light wavelength of 445 nm to excite RPE and elastin in the subject's eye having a fluorescence emission wavelength between 520-570 nm. Stargardt's disease may be detected using an excitation light wavelength between 340-500 nm to excite RPE in the subject's eye having a fluorescence emission wavelength of 540 nm and/or between 430-460 nm. Choroideremia may be detected using an excitation light wavelength between 340-500 nm to excite RPE in the subject's eye having a fluorescence emission wavelength of 540 nm and/or between 430-460 nm.

The inventors have also developed techniques for using a captured image of a person's retina fundus to diagnose various health issues of the person. For example, in some embodiments, any of the health conditions described above may be diagnosed.

In some embodiments, imaging techniques described herein may be used for health status determination, which may include determinations relating to cardiac health, cardiovascular disease and/or cardiovascular risk, anemia, retinal toxicity, body mass index, water weight, hydration status, muscle mass, age, smoking habits, blood oxygen levels, heart rate, white blood cell counts, red blood cell counts, and/or other such health attributes. For example, in some embodiments, a light source having a bandwidth of at least 40 nm may be configured with sufficient imaging resolution capturing red blood cells having a diameter of 6 µm and white blood cells having diameters of at least 15 µm. Accordingly, imaging techniques described herein may be configured to facilitate sorting and counting of red and white blood cells, estimating the density of each within the blood, and/or other such determinations.

In some embodiments, imaging techniques described herein may facilitate tracking of the movement of blood cells to measure blood flow rates. In some embodiments, imaging techniques described herein may facilitate tracking the width of the blood vessels, which can provide an estimate of blood pressure changes and profusion. For example, an imaging apparatus as described herein configured to resolve red and white blood cells using a 2-dimensional (2D) spatial scan completed within 1 µs may be configured to capture movement of blood cells at 1 meter per second. In some embodiments, light sources that may be included in apparatuses described herein, such as superluminescent diodes, LEDs, and/or lasers, may be configured to emit sub-microsecond light pulses such that an image may be captured in less than one microsecond. Using spectral scan techniques described herein, an entire cross section of a scanned line (e.g., in the lateral direction) versus depth can be captured in a sub-microsecond. In some embodiments, a 2-dimensional (2D) sensor described herein may be configured to capture such images for internal or external reading at a slow rate and subsequent analysis. In some embodiments, a 3D sensor may be used. Embodiments described below overcome the challenges of obtaining multiple high quality scans within a single microsecond.

In some embodiments, imaging apparatuses described herein may be configured to scan a line aligned along a blood vessel direction. For example, the scan may be rotated and positioned after identifying a blood vessel configuration of the subject's retina fundus and selecting a larger vessel for observation. In some embodiments, a blood vessel that is small and only allows one cell to transit the vessel in sequence may be selected such that the selected vessel fits within a single scan line. In some embodiments, limiting the target imaging area to a smaller section of the subject's eye may reduce the collection area for the imaging sensor. In some embodiments, using a portion of the imaging sensor facilitates increasing the imaging frame rate to 10 s of KHz. In some embodiments, imaging apparatuses described herein may be configured to perform a fast scan over a small area of the subject's eye while reducing spectral spread interference. For example, each scanned line may use a different section of the imaging sensor array. Accordingly, multiple depth scans may be captured at the same time, where each scan is captured by a respective portion of the imaging sensor array. In some embodiments, each scan may be magnified to result in wider spacing on the imaging sensor array, such as wider than the dispersed spectrum, so that each depth scan may be measured independently.

VIII. Conclusion

Having thus described several aspects and embodiments of the technology set forth in the disclosure, it is to be appreciated that various alterations, modifications, and improvements will readily occur to those skilled in the art. Such alterations, modifications, and improvements are intended to be within the spirit and scope of the technology described herein. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments can be implemented in any of numerous ways. One or more aspects and embodiments of the present disclosure involving the performance of processes or methods may utilize program instructions executable by a device (e.g., a computer, a processor, or other device) to perform, or control performance of, the processes or methods. In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above. The computer readable medium or media can be transportable, such that the program or programs stored thereon can be loaded onto one or more different computers or other processors to implement various ones of the aspects described above. In some embodiments, computer readable media may be non-transitory media.

The terms "program" or "software" are used herein in a generic sense to refer to any type of computer code or set of computer-executable instructions that can be employed to program a computer or other processor to implement various aspects as described above. Additionally, it should be appreciated that according to one aspect, one or more computer programs that when executed perform methods of the present disclosure need not reside on a single computer or processor, but may be distributed in a modular fashion among a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The acts performed as part of the methods may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

What is claimed is:

1. A method, comprising:
   illuminating a plurality of portions of a subject's eye using at least one light source to determine a location of a first portion of the subject's eye, the at least one light source comprising a plurality of light sources configured to illuminate respective portions of the subject's eye, the plurality of light sources comprising a first light source configured to illuminate the first portion of the subject's eye and a second light source configured to illuminate a second portion of the subject's eye different from the first portion;

after illuminating the plurality of portions of the subject's eye, selecting a subset of the plurality of light sources based on the determined location of the first portion of the subject's eye, the selecting comprising:
including the first light source in the subset of the plurality of light sources based on (i) the determined location of the first portion of the subject's eye, and (ii) the configuration of the first light source; and
excluding the second light source from the subset of the plurality of light sources based on (i) the determined location of the first portion of the subject's eye, and (ii) the configuration of the second light source;

after selecting the subset of the plurality of light sources, adjusting the at least one light source to selectively illuminate the first portion of the subject's eye with illumination light, the adjusting comprising turning on the selected subset of the plurality of light sources; and capturing an image and/or measurement of the first portion of the subject's eye while selectively illuminating the first portion of the subject's eye with the illumination light.

2. The method of claim 1, wherein:
the method further comprises focusing the illumination light on the first portion of the subject's eye using a plurality of optical components.

3. The method of claim 2, wherein the plurality of light sources is arranged in a ring.

4. The method of claim 3, wherein:
the plurality of optical components comprises a first plate, the first plate having an annulus and an obscuration positioned within the annulus; and
selectively illuminating the first portion of the subject's eye comprises transmitting the illumination light from the selected subset of the plurality of light sources arranged in the ring through a first portion of the annulus.

5. The method of claim 1, wherein:
from the at least one light source comprises a display screen configured to selectively provide the illumination light to illuminate the first portion of the subject's eye; and
the method further comprises focusing the illumination light on the first portion of the subject's eye using a plurality of optical components.

6. The method of claim 1, further comprising:
focusing the illumination light on the first portion of the subject's eye using a plurality of optical components comprising:
a mirror with an aperture; and
one or more optical components configured to focus the illumination light on the mirror; and
receiving reflected illumination light from the first portion of the subject's eye at an imaging and/or measuring sensor through the aperture.

7. The method of claim 1, wherein:
illuminating the plurality of portions of the subject's eye to determine the location of the first portion of the subject's eye comprises illuminating the second portion of the subject's eye different from the first portion of the subject's eye,
the at least one light source comprises a white light source, and the method further comprises focusing the illumination light on the first portion of the subject's eye using a plurality of optical components.

8. The method of claim 1, wherein:
illuminating the plurality of portions of the subject's eye to determine the location of the first portion of the subject's eye comprises illuminating the second portion of the subject's eye,
the at least one light source comprises a white light source and the method further comprises focusing first white light from the white light source on the first portion of the subject's eye using a plurality of optical components,
illuminating the second portion of the subject's eye comprises focusing second white light from the white light source on the second portion of the subject's eye; and
the first white light is brighter than the second white light.

9. The method of claim 1, wherein the first and second portions of the subject's eye are located on a pupil of the subject's eye.

10. The method of claim 1, wherein at least the second portion of the subject's eye is located on an iris of the subject's eye.

11. An imaging and/or measuring apparatus comprising:
at least one light source, the at least one light source comprising a plurality of light sources configured to illuminate respective portions of a subject's eye, the plurality of light sources comprising a first light source configured to illuminate a first portion of the subject's eye and a second light source configured to illuminate a second portion of the subject's eye different from the first portion of the subject's eye;
at least one imaging and/or measuring sensor; and
at least one processor coupled to the at least one light source and the at least one imaging and/or measuring sensor and configured to:
transmit instructions to the at least one light source configured to cause the at least one light source to illuminate a plurality of portions of the subject's eye;
determine a location of a first portion of the subject's eye based on the illumination of the plurality of the portions of the subject's eye;
after determining the location of the first portion of the subject's eye, select a subset of the plurality of light sources based on the determined location of the first portion of the subject's eye, the selecting comprising:
including the first light source in the subset of the plurality of light sources based on (i) the determined location of the first portion of the subject's eye and (ii) the configuration of the first light source; and
excluding the second light source from the subset of the plurality of light sources based on (i) the determined location of the first portion of the subject's eye and (ii) the configuration of the second light source;
after selecting the subset of the plurality of light sources, transmit instructions to the at least one light source configured to cause an adjustment of the at least one light source to selectively illuminate the first portion of the subject's eye with illumination light by turning on the selected subset of the plurality of light sources; and
transmit instructions to the at least one imaging and/or measuring sensor configured to cause the at least one imaging and/or measuring sensor to capture an image and/or measurement of the first portion of the subject's eye while the at least one light source selectively illuminates the first portion of the subject's eye.

12. The imaging and/or measuring apparatus of claim 11, wherein:
the imaging and/or measuring apparatus further comprises a plurality of optical components configured to focus the illumination light on the first portion of the subject's eye.

13. The imaging and/or measuring apparatus of claim 12, wherein the plurality of light sources is arranged in a ring.

14. The imaging and/or measuring apparatus of claim 13, wherein the plurality of optical components comprises a first plate, the first plate having an annulus and an obscuration positioned within the annulus, and wherein the selected subset of the plurality of light sources is configured to transmit the illumination light through a first portion of the annulus.

15. The imaging and/or measuring apparatus of claim 11, wherein:
the at least one light source comprises a display screen;
the imaging and/or measuring apparatus is configured to adjust the display screen to selectively provide the illumination light to illuminate the first portion of the subject's eye; and
the imaging and/or measuring apparatus further comprises a plurality of optical components configured to focus the illumination light on the first portion of the subject's eye.

16. The imaging and/or measuring apparatus of claim 11, wherein the imaging and/or measuring apparatus further comprises:
a plurality of optical components comprising:
a mirror having an aperture; and
one or more optical components configured to focus the illumination light on the mirror,
wherein the at least one imaging and/or measuring sensor is configured to receive reflected illumination light from the first portion of the subject's eye through the aperture of the mirror.

17. The imaging and/or measuring apparatus of claim 11, wherein:
the at least one light source comprises a white light source configured to provide the illumination light;
a plurality of optical components configured to focus the illumination light on the first portion of the subject's eye;
an infrared (IR) light source;
a plurality of IR optical components configured to focus IR light from the IR light source on the second portion of the subject's eye to determine the location of the first portion of the subject's eye, and
wherein the imaging and/or measuring apparatus is further configured to:
determine the location of the first portion of the subject's eye at least in part by illuminating the second portion of the subject's eye; and
adjust the at least one light source in response to determining the location of the first portion of the subject's eye.

18. The imaging and/or measuring apparatus of claim 11, wherein:
the at least one light source comprises a white light source configured to provide the illumination light;
the imaging and/or measuring apparatus further a plurality of optical components configured to:
focus the illumination light on the first portion of the subject's eye; and
to locate the second portion of the subject's eye, focus the illumination light on the second portion of the subject's eye; and
the imaging and/or measuring apparatus is configured to illuminate the first portion of the subject's eye with brighter white light than white light used to illuminate the second portion of the subject's eye.

19. The imaging and/or measuring apparatus of claim 11, wherein the first and second portions of the subject's eye are located on a pupil of the subject's eye.

20. The imaging and/or measuring apparatus of claim 11, wherein at least the second portion of the subject's eye is located on an iris of the subject's eye.

* * * * *